United States Patent
Chiba

(10) Patent No.: US 10,754,501 B2
(45) Date of Patent: Aug. 25, 2020

(54) MAP PRESENTATION SYSTEM AND NAVIGATION SYSTEM

(71) Applicant: ALPINE ELECTRONICS, INC., Shinagawa-ku, Tokyo (JP)

(72) Inventor: Rie Chiba, Iwaki (JP)

(73) Assignee: Alpine Electronics, Inc., Toyko (JP)

( * ) Notice: Subject to any disclaimer, the term of this patent is extended or adjusted under 35 U.S.C. 154(b) by 235 days.

(21) Appl. No.: 15/468,754

(22) Filed: Mar. 24, 2017

(65) Prior Publication Data

US 2017/0308268 A1 Oct. 26, 2017

(30) Foreign Application Priority Data

Apr. 21, 2016 (JP) .................................. 2016-085003

(51) Int. Cl.
| | | |
|---|---|---|
| *G06F 3/0481* | (2013.01) | |
| *G01C 21/36* | (2006.01) | |
| *G06F 3/041* | (2006.01) | |
| *G06F 3/0485* | (2013.01) | |
| *G06F 3/0488* | (2013.01) | |

(52) U.S. Cl.
CPC ....... *G06F 3/04817* (2013.01); *G01C 21/367* (2013.01); *G01C 21/3664* (2013.01); *G01C 21/3682* (2013.01); *G06F 3/041* (2013.01); *G06F 3/0485* (2013.01); *G06F 3/0488* (2013.01)

(58) Field of Classification Search
CPC .... G06F 3/04817; G06F 3/041; G06F 3/0485; G06F 3/0488; G01C 21/3664; G01C 21/367; G01C 21/3682
See application file for complete search history.

(56) References Cited

U.S. PATENT DOCUMENTS

| | | | | |
|---|---|---|---|---|
| 6,396,475 | B1 * | 5/2002 | Ellenby .............. | G01C 21/3682 345/156 |
| 2008/0306683 | A1 * | 12/2008 | Ando ................. | G01C 21/3664 701/431 |
| 2011/0055739 | A1 * | 3/2011 | MacFarlane ....... | G01C 21/3664 715/764 |

(Continued)

FOREIGN PATENT DOCUMENTS

| | | |
|---|---|---|
| JP | H10-96648 A | 4/1998 |
| JP | 2002-039778 | 2/2002 |

(Continued)

OTHER PUBLICATIONS

Notification of Reasons for Refusal for Japanese Patent Application No. 2016-085003 dated Dec. 10, 2019; 10 pages.

*Primary Examiner* — Jennifer N To
*Assistant Examiner* — Amy P Hoang
(74) *Attorney, Agent, or Firm* — Brinks Gilson & Lione

(57) ABSTRACT

A navigation screen generator displays only icons of objects of an object category set as "DISPLAY" in an icon presentation control table on a map image. If a touch occurs at a position on the map image of the navigation screen where no icon is displayed, a controller sets the object category of the object corresponding to the touch position as "DISPLAY" in an icon presentation control table. Then, icons of the objects having the same object category as that of the object corresponding to touch position are displayed on the map image of the navigation screen.

10 Claims, 14 Drawing Sheets

(56) References Cited

U.S. PATENT DOCUMENTS

| | | | |
|---|---|---|---|
| 2011/0153186 A1* | 6/2011 | Jakobson | G01C 21/20 |
| | | | 701/532 |
| 2011/0175928 A1* | 7/2011 | Hashimoto | G01C 21/3682 |
| | | | 345/629 |
| 2013/0317745 A1* | 11/2013 | Sano | G09B 29/007 |
| | | | 701/533 |
| 2016/0061624 A1* | 3/2016 | Newlin | G01C 21/3611 |
| | | | 701/426 |

FOREIGN PATENT DOCUMENTS

| | | |
|---|---|---|
| JP | 2002-243468 | 8/2002 |
| JP | 2008-304325 A | 12/2008 |
| JP | 2010-038620 | 2/2010 |
| JP | 2011-145609 A | 7/2011 |

\* cited by examiner

| OBJECT CATEGORY | DISPLAY/HIDE |
|---|---|
| GAS STATION | HIDE |
| CONVENIENCE STORE | DISPLAY |
| RESTAURANT | HIDE |
| BANK | HIDE |
| PARKING LOT | HIDE |
| ⋮ | ⋮ |

ICON PRESENTATION CONTROL TABLE

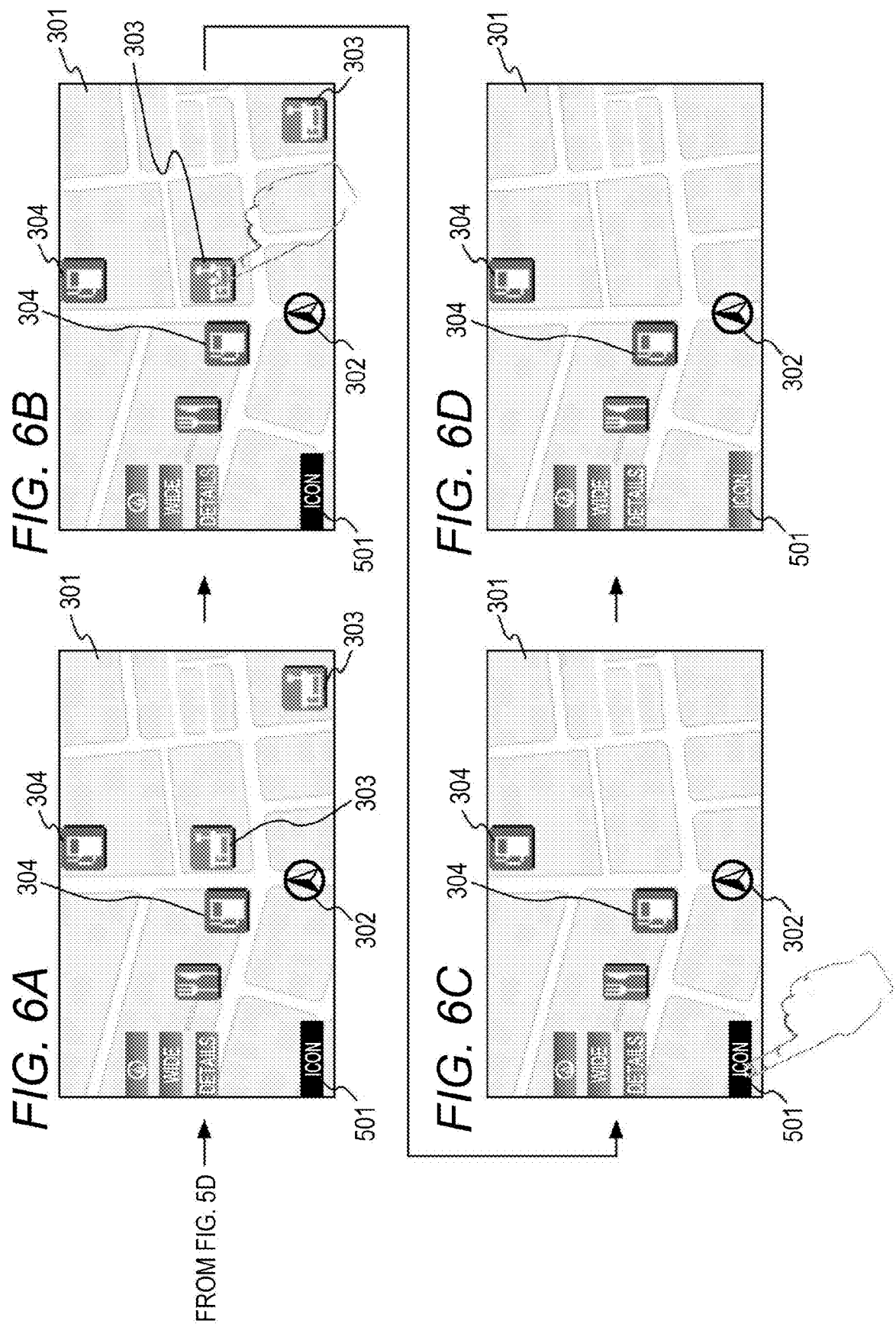

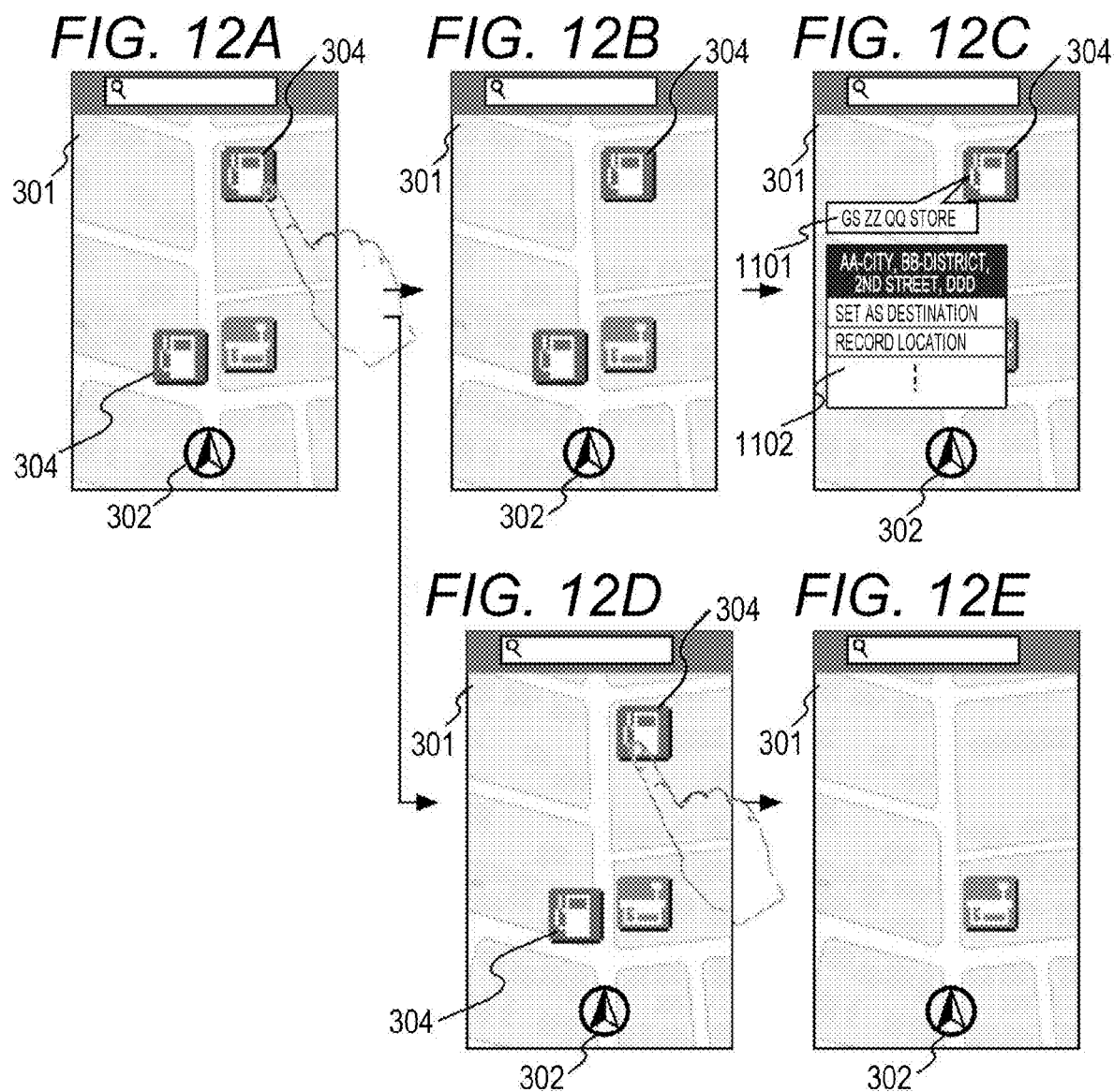

MAP PRESENTATION SYSTEM AND NAVIGATION SYSTEM

RELATED APPLICATION

The present application claims priority to Japanese Patent Application Number 2016-085003, filed Apr. 21, 2016, the entirety of which is hereby incorporated by reference.

BACKGROUND

1. Field

The present disclosure relates to a technology of displaying icons representing objects.

2. Description of the Related Art

One technique of displaying icons representing objects on a map includes a navigation device in which an object category selection screen is displayed, a selection for the object category is received from a user on the screen, and the selected category is set as an object category whose icons are displayed on the map (for example, see JP 2010-38620 A).

Another technique of displaying icons representing objects on a map includes a navigation device in which a DISPLAY/HIDE button is displayed along with a map, and a changeover between DISPLAY and HIDE states on the map for object icons of a particular predetermined category is performed in response to a manipulation of the DISPLAY/HIDE button (for example, see JP 2002-243468 A).

In the aforementioned technique discussed in JP 2010-38620 A, if a user desires to change over between DISPLAY and HIDE states on the map during the use of the map, a user is required to change the displayed screen from map presentation to an object category selection screen and then select the object category represented by the icon on the map. This work is disadvantageous and cumbersome.

Meanwhile, in the aforementioned technique discussed in JP 2002-243468 A, for a particular predetermined category of objects, the changeover between DISPLAY and HIDE states of icons of this object can be performed through a simple and easy manipulation such as pressing a DISPLAY/HIDE button while maintaining presentation of the map. However, for objects of categories other than the particular predetermined category, it is difficult to simply and easily change over between DISPLAY and HIDE states of the icons of the objects of these categories while maintaining the presentation of the map.

SUMMARY

In view of the aforementioned problems, an object of the present disclosure is to allow a user to simply and easily change over between DISPLAY and HIDE states of icons of objects for an arbitrary object category on a map while maintaining the presentation of the map.

According to an aspect of the present disclosure, there is provided a map presentation system configured to display a map, including: an icon DISPLAY/HIDE setting unit configured to set a DISPLAY/HIDE option of an icon representing an object of an object category for each object categories representing a category of the object; a presentation image display unit configured to display a presentation image on the map, in which an icon representing an object of the object category set as "HIDE" on the map is not arranged, and an icon representing an object of the object category set as "DISPLAY" on the map is arranged; and a position input receiver unit configured to receive a position input on the displayed image. Here, if a position of the input received by the position input receiver unit is a position on the map corresponding to an object position of the object category set as "HIDE," the icon DISPLAY/HIDE setting unit recognizes the object category of the object corresponding to the input position on the map and sets "DISPLAY" for the recognized object category.

Here, in the map presentation system described above, if a position of the input received by the position input receiver unit is a position where an icon is displayed, the icon DISPLAY/HIDE setting unit may recognize an object category of the object represented by the icon located at the input position and set "HIDE" for the recognized object category, in addition to or instead of the aforementioned operation.

Using the map presentation system described above, a user is allowed to instruct to display or erase icons of each object of an arbitrary object category on a category-by-category basis through a simple and easy manipulation just by inputting a position on the map corresponding to an arbitrary object position of the object category desired to display the icon, or inputting an icon position of an arbitrary object of the object category desired to erase the icon from presentation.

Here, the map presentation system described above may further include: a mode setting unit configured to set an icon presentation edit mode in response to a user's manipulation; and a scroll control unit, wherein the position input receiver unit receives an input on the position only while the icon presentation edit mode is set, and the scroll control unit receives an input at a position on the presentation image and causes the presentation image display unit to perform scrolling of a map of the presentation image depending on the input position, while the icon presentation edit mode is not set.

The map presentation system described above may further include: a touch panel; and a scroll control unit, wherein the position input receiver unit receives an input at a position on the presentation image corresponding to a touch position when a position is continuously touched for a predetermined time or longer without moving the touch position on the touch panel, and the scroll control unit causes the presentation image display unit to perform scrolling of the map of the presentation image when the touch position is moved by holding the touch on the touch panel.

According to another aspect of the present disclosure, there is provided a map presentation system configured to display a map, including: an icon DISPLAY/HIDE setting unit configured to set a DISPLAY/HIDE option of an icon representing an object of an object category for each of the object categories representing a category of the object; a presentation image display unit configured to display a presentation image on the map, in which an icon representing an object of the object category set as "HIDE" on the map is not arranged, and an icon representing an object having the object category set as "DISPLAY" on the map is arranged; and a position input receiver unit configured to receive an input at a position on the presentation image. Here, if the input position received by the position input receiver unit is a position on the map corresponding to an object position of the object category set as "HIDE," the icon DISPLAY/HIDE setting unit displays a menu containing menu items for receiving an instruction to change a presentation setting of an object icon corresponding to the input position on the map and sets "DISPLAY" for the object category of the object corresponding to the input position on the map when an instruction to change the presentation setting of the icon is received on the displayed menu.

Here, in the map presentation system described above, if the input position received by the position input receiver unit is a position where an icon is displayed, the icon DISPLAY/HIDE setting unit may display a menu containing menu items for receiving an instruction to change a presentation setting of the icon located at the input position and set "HIDE" for the object category of the object represented by the icon located at the input position when the instruction to change the presentation setting of the icon is received on the displayed menu, in addition to or instead of the aforementioned operation.

Using the map presentation system described above, a user is allowed to instruct to display or erase icons of each object of an arbitrary object category on a category-by-category basis through a simple and easy manipulation just by performing a manipulation for instructing to change a presentation setting of the icon using the menu displayed by inputting a position on the map corresponding to an arbitrary object position of the object category desired to display its icons, or a manipulation for instructing to change a presentation setting of the icon using the menu displayed by inputting a position of an arbitrary object icon of the object category desired to erase it from presentation.

According to further another aspect of the present disclosure, there is provided a map presentation system configured to display a map, including: an icon DISPLAY/HIDE setting unit configured to set a DISPLAY/HIDE option of an icon representing an object of an object category for each of the object categories representing a category of the object; a presentation image display unit configured to display a first presentation image on the map, in which an icon representing an object of the object category set as "HIDE" on the map is not arranged, and an icon representing an object having the object category set as "DISPLAY" on the map is arranged; a position input receiver unit configured to receive an input at a position on the presentation image; and a scroll control unit. Here, the scroll control unit controls the presentation image display unit such that a map of the presentation image is scrolled depending on the input position when the presentation image display unit displays the first presentation image, and the position input receiver unit receives a position input. In addition, after the scroll presentation is completed, the presentation image display unit displays a second presentation image in which the icons representing the objects of the object category set as "DISPLAY" on the map are arranged as opaque icons on the map, and the icons representing the objects of the object category set as "HIDE" on the map are arranged as semitransparent icons on the map. In addition, when the presentation image display unit displays the second presentation image, and the input position received by the position input receiver unit is located on the semitransparent icon, the icon DISPLAY/HIDE setting unit recognizes an object category of the object represented by the icon located at the input position and sets "DISPLAY" for the recognized object category.

Here, in the map presentation system described above, when the presentation image display unit displays the second presentation image, and the input position received by the position input receiver unit is located on an opaque icon, the icon DISPLAY/HIDE setting unit may recognize an object category of the object represented by the icon located at the input position and set "HIDE" for the recognized object category.

Using the map presentation system described above, a user is allowed to instruct to scroll the map by inputting a position on the map of the presentation image. In addition, a user is allowed to instruct to display or erase each object icon of an arbitrary object category on a category-by-category basis through a simple and easy manipulation just by touching an arbitrary object icon of the object category displayed in a semitransparent manner after scrolling and desired to display, or by touching an arbitrary opaque object icon of the object category desired to erase.

According to still another aspect of the present disclosure, there is provided a navigation system including: the map presentation system described above; and a current position computation unit configured to compute a current position. Here, the presentation image display unit displays the presentation image on the map, the presentation image including a mark representing the current position computed by the current position computation unit, and icons representing the objects having the object category set as "DISPLAY" on the map.

As described above, according to embodiments of the present disclosure, it is possible to simply and easily change over between DISPLAY and HIDE of the icons of the object category for an arbitrary object category on the map while the presentation of the map is maintained.

BRIEF DESCRIPTION OF THE DRAWINGS

FIGS. 6A to 6D are diagrams illustrating a processing example of the touch response presentation control process according to the second embodiment of the disclosure;

FIGS. 12A to 12E are diagrams illustrating a processing example of the touch response presentation control process according to the fourth embodiment of the disclosure;

DETAILED DESCRIPTION

Embodiments of the present disclosure will now be described.

Figure 1:
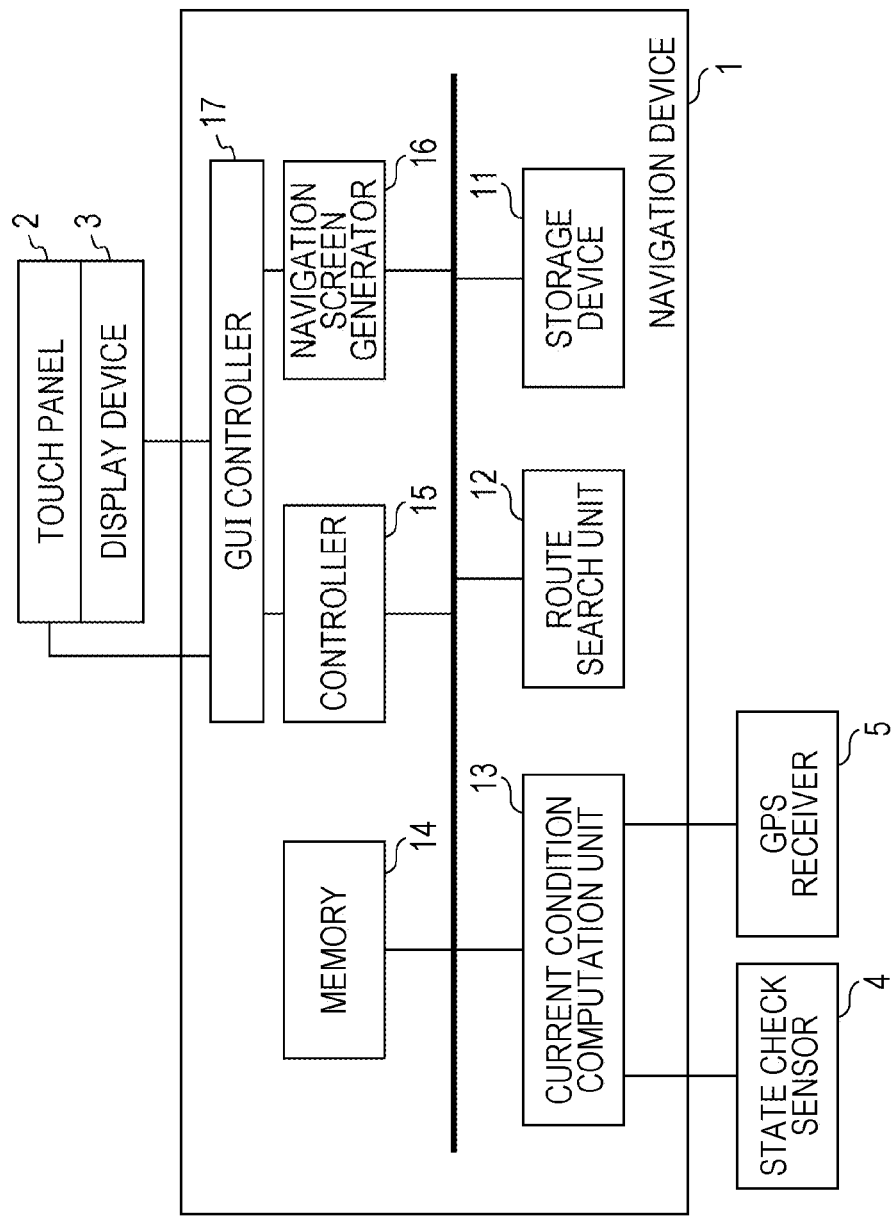
FIG. 1 is a block diagram illustrating a configuration of a vehicle built-in system according to an embodiment of the disclosure.

First, a first embodiment will be described. FIG. 1 illustrates a configuration of a vehicle built-in system according to the first embodiment. The vehicle built-in system is a device mounted in a vehicle. As illustrated in FIG. 1, the vehicle built-in system includes a navigation device 1, a touch panel 2, a display device 3, a condition check sensor 4, and a GPS receiver 5. Here, the touch panel 2 is disposed to overlap on a display screen of the display device 3 to receive a position input on the display screen of the display device 3 from a user's touch.

The condition check sensor 4 is a sensor for detecting various conditions of a vehicle, including a sensor for detecting a travel direction of the vehicle such as a gyro sensor or a geomagnetic sensor, a sensor for detecting a vehicle speed such as a vehicle speed pulse sensor, and the like.

In addition, the navigation device 1 includes a storage unit 11 such as a hard disk drive (HDD) for storing map data or other various data, a route search unit 12, a current condition computation unit 13, a memory 14, a controller 15, a navigation screen generator 16, and a GUI controller 17 for providing a user with a graphic user interface (GUI) using the touch panel 2 or the display device 3.

The navigation device 1 described above may be a computer having a typical configuration provided with peripheral devices such as a hardware processor, a memory, a graphic processor, or a geometric processor. In this case, each unit of the navigation device 1 described above may be implemented by allowing a microprocessor to execute programs prepared in advance. In this case, these programs may be provided in the navigation device 1 using a recording medium or via a proper communication network.

Figures 2A, 2B:
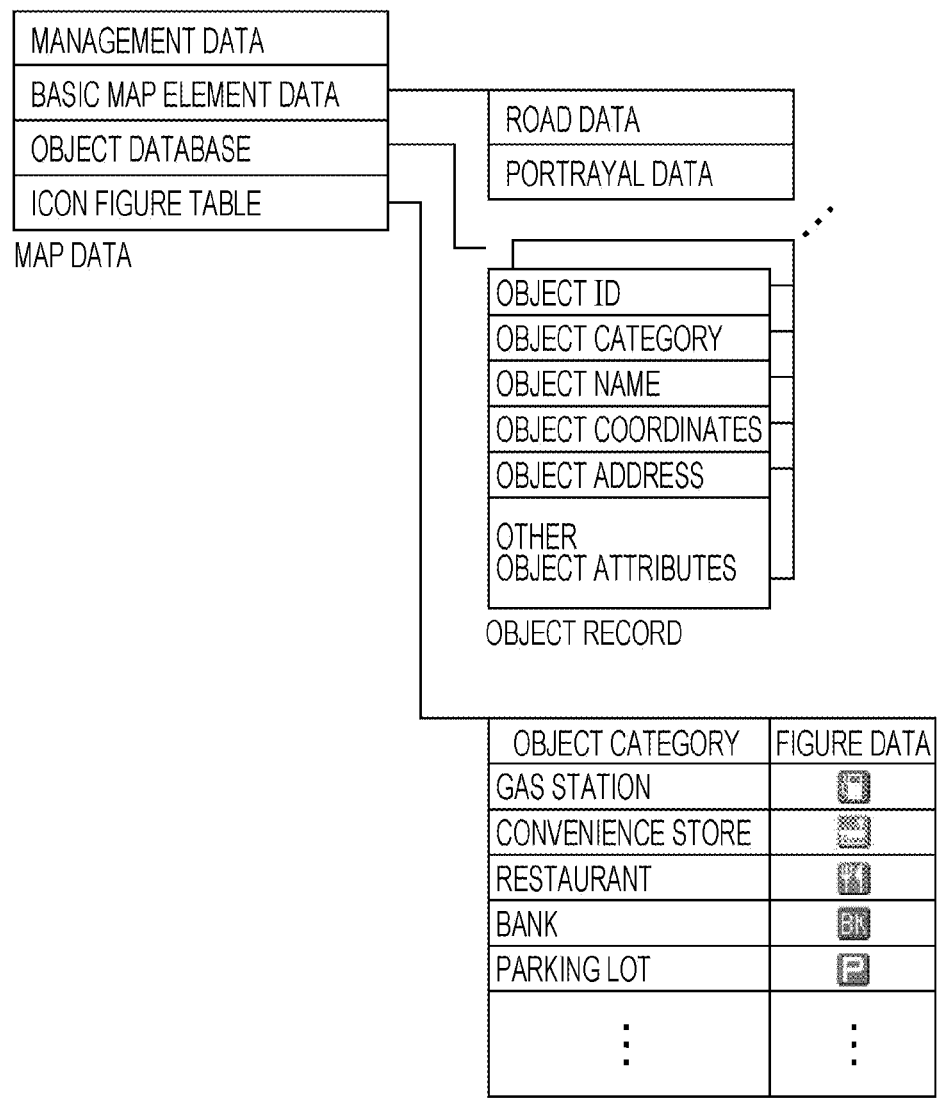
FIGS. 2A and 2B are diagrams illustrating map data and an icon presentation control table according to an embodiment of the disclosure.

FIG. 2A illustrates map data stored in the storage unit 11.

As illustrated in FIG. 2A, the map data includes administrative data such as a map data production date/time, basic map element data representing a map, an object database, and an icon figure table.

The basic map element data include road data and portrayal data. Here, the road data refers to a set of links connected with nodes to represent a road network. In addition, the portrayal data refers to each figure serving as a geographic presentation item on the map, such as geographical features, road features, and building features, or data on character lines presented on the map, such as a building name, a road name, or an intersection name.

The object database of the map data contains information on the objects set by a map data producer in the map data in advance and has an object record provided for each object. In addition, each object record contains an object ID serving as an identifier for the object, an object category representing a category of the object such as "gas station," "convenience store," and "restaurant," an object name representing a name of the object, an object coordinates value representing a position of the object, an object address representing an address of the object, and other object attributes representing various types of information regarding the object.

The icon figure table of the map data is provided with entries for each object category. A corresponding object category and figure data that define a figure used for icons representing objects of the corresponding object category on the map are recorded in each entry.

FIG. 2B illustrates an icon presentation control table stored in the memory 14 according to the first embodiment. As illustrated in FIG. 2B, the icon presentation control table is provided with entries for each object category. A corresponding object category and a DISPLAY/HIDE option representing whether icons of the object of the corresponding object category are displayed or hidden are set in each entry.

Meanwhile, in this configuration, the current condition computation unit 13 of the navigation device 1 applies a map matching process with a map for a ambient landscape of a current position, indicated by the map data read from the storage unit 11 and computed previously, for a current position or a travel direction obtained from the output of the condition check sensor 4 or the GPS receiver 5 to compute the current vehicle position and the current vehicle travel direction, and stores the current position and the current travel direction in the memory 14. This process is repeatedly executed.

The controller 15 receives a destination setting manipulation from a user through the touch panel 2 or the GUI controller 17 to set a destination, stores the set destination in the memory 14, instructs the route search unit 12 to search a route to the destination, and stores the searched route in the memory 14 as a guide route.

The controller 15 detects arrival at the destination set in the memory 14 using the current position computed by the current condition computation unit 13. If a vehicle arrives at the destination, the controller 15 clears the destination and the guide route set in the memory 14.

The controller 15 sets a display direction such that the current travel direction stored in the memory 14 or the north direction is displayed on the top. In addition, the controller 15 installs a map presentation scale depending on a user setting performed by a user in advance or an initial setting.

The navigation screen generator 16 generates a map image by setting, as a map presentation range, a geographic range having a predetermined size determined depending on the established display direction and the established map presentation scale defined with respect to the current position stored in the memory 14, including environments around a main vehicle, and displaying the map of the map presentation range on the basis of the established map presentation scale. In addition, the navigation screen generator 16 generates a navigation screen by portraying a current position mark at a position on the generated map image corresponding to the current position stored in the memory 14 and displays the generated navigation screen on the display device 3 using the GUI controller 17.

If there is an object category set as "DISPLAY" in the DISPLAY/HIDE option of the icon presentation control table stored in the memory 14, the navigation screen generator 16 generates a navigation screen by portraying the icon of the object of this object category at a position corresponding to this object on the map image.

Here, a figure represented by the figure data recorded for this object category in the icon figure table is used as the icon of the object of the object category set as "DISPLAY" in the DISPLAY/HIDE option. In addition, the position of the object of the object category set as "DISPLAY" in the DISPLAY/HIDE option is obtained as an object coordinates value of each object record on which this object category is recorded.

If the destination or the guide route is set in the memory 14, the navigation screen generator 16 generates a navigation screen by portraying a destination mark representing a position of the destination on the map image or a guide route figure representing the guide route on the map image as well as the current position mark.

Figure 3A:
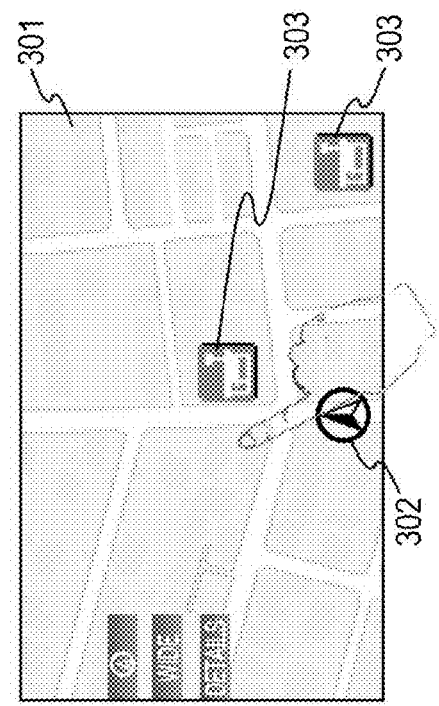
FIGS. 3A to 3D are diagrams illustrating a processing example of a touch response presentation control process according to a first embodiment of the disclosure.

FIG. 3A illustrates the navigation screen displayed as a result of this process.

In the navigation screen illustrated in FIG. 3A, the destination and the guide route are not set, and the DISPLAY/HIDE option is set as "DISPLAY" only for an object category "convenience store" in the icon presentation control table.

In this case, the navigation screen shows a current position mark 302 representing the current position and a convenience store icon 303 representing the object used for the "convenience store" on the map image 301, as illustrated in FIG. 3A.

Figure 4:
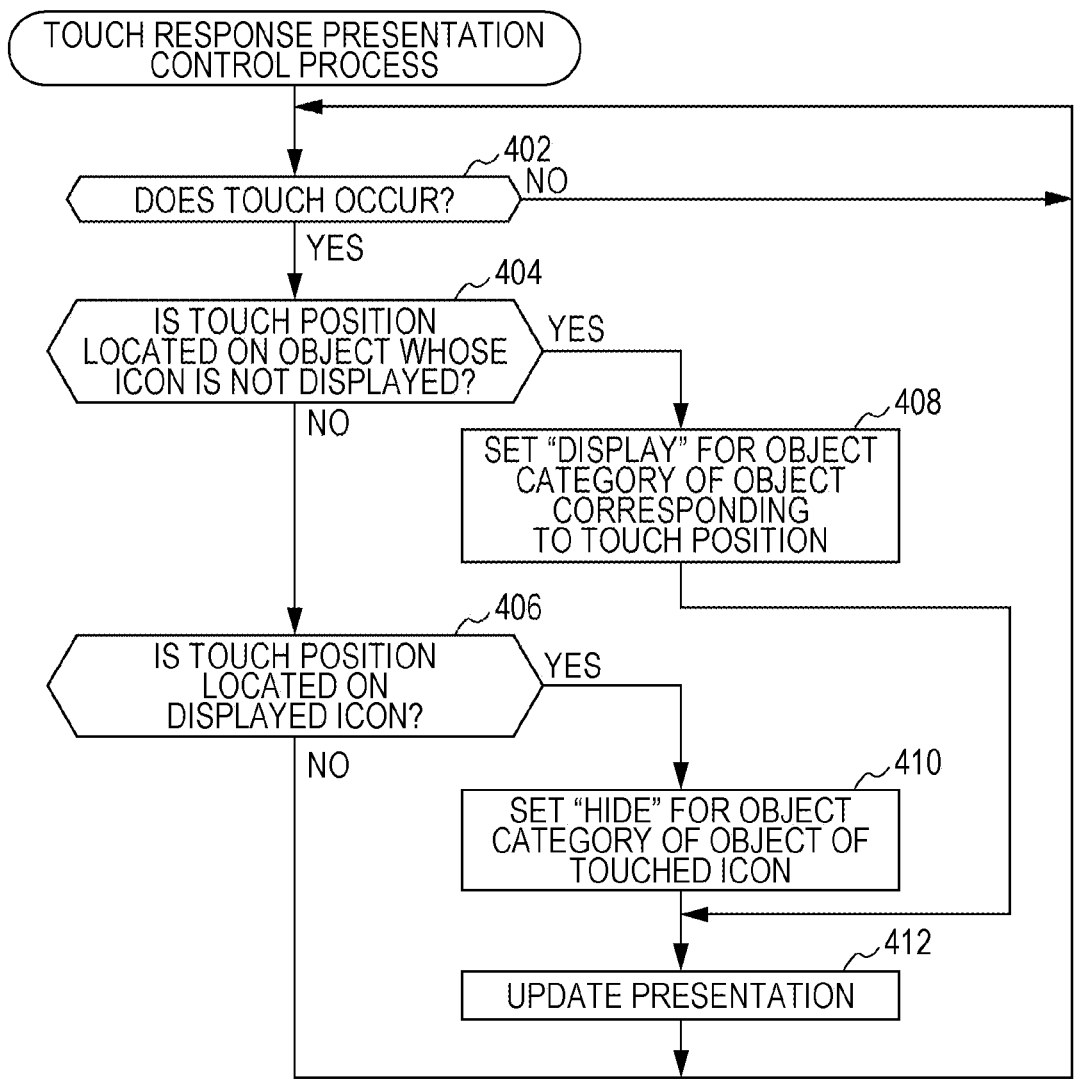
FIG. 4 is a flowchart illustrating the touch response presentation control process according to the first embodiment of the disclosure.

A touch response presentation control process executed by the controller 15 of the vehicle built-in system will now be described. FIG. 4 illustrates a sequence of the touch response presentation control process. As illustrated in FIG. 4, in this touch response presentation control process, the controller 15 monitors occurrence of a touch on the touch panel 2 from a user (step 402).

If a user's touch occurs (step 402), it is determined whether or not the touch position is located on the object whose icon is not displayed on the map image 301 (step 404). Here, the position of the object whose icon is not displayed is obtained as an object coordinates value of each object record of the object category set as "HIDE" in the DISPLAY/HIDE option of the icon presentation control table.

If the touch position is located on the map image 301 corresponding to a position of the object whose icon is not displayed (step 404), an object category recorded in the object record of the object located in this touch position is obtained, and the DISPLAY/HIDE option of the obtained object category is set as "DISPLAY" in the icon presentation control table (step 408).

Then, the navigation screen generator 16 updates presentation of the navigation screen (step 412), and the process returns to step 402 for monitoring.

Meanwhile, if the touch position is not the position of the object whose icon is not displayed on the map image 301 (step 404), it is determined whether or not the touch position is a position where the icon is displayed (step 406). If the touch position is the position where the icon is displayed, an object category recorded in the object record of the object represented by the icon located in the touch position is obtained, and the DISPLAY/HIDE option of the obtained object category is set as "HIDE" in the icon presentation control table (step 410).

Then, the navigation screen generator 16 updates the presentation of the navigation screen (step 412), and the process returns to step 402 for monitoring.

If the touch position is neither the position located on the map image 301 corresponding to the position of the object whose icon is not displayed (step 404) nor the position where the icon is displayed (step 406), the process directly returns to step 402 for monitoring.

Figure 3B:
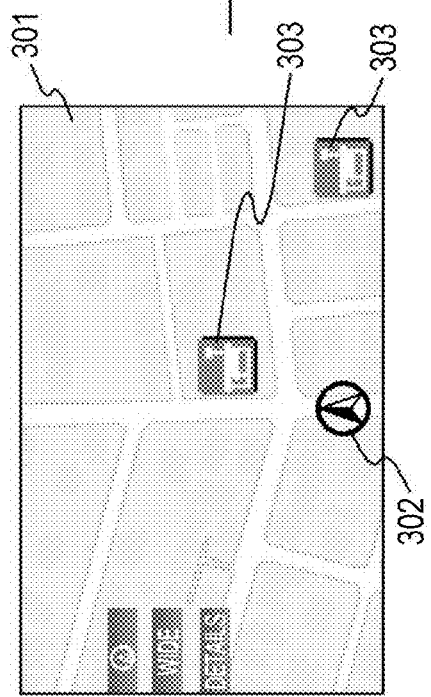
Figure 3C:
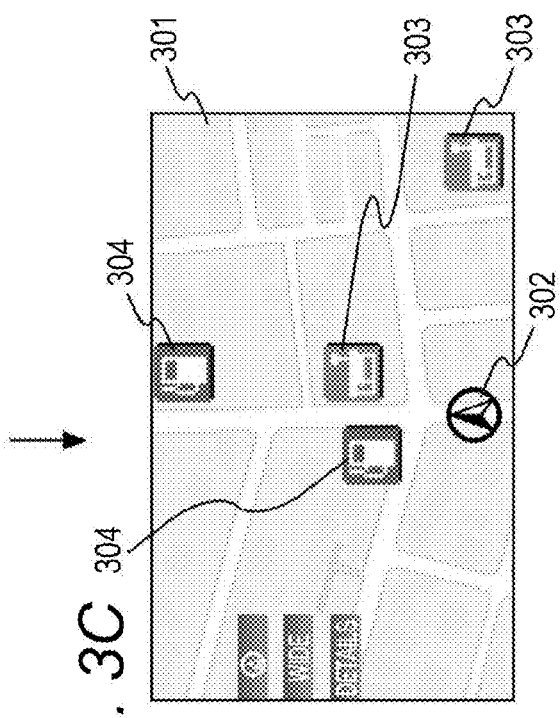

Hereinbefore, the touch response presentation control process performed by the controller 15 has been described. In this touch response presentation control process, if a user touches a position on the map image 301 of the navigation screen corresponding to a position of the object of the object category desired by a user to display on the basis of user's remembrance or an actual landscape as illustrated in FIG. 3B (no icon is displayed at that time), the DISPLAY/HIDE option in the icon presentation control table is set as "DISPLAY" for the object category of the object corresponding to the touched position (in FIG. 3C, the object category "gas station"). In addition, as illustrated in FIG. 3C, icons of each object having the same object category as the object corresponding to the touched position (in FIG. 3C, gas station icons 304 as the icon of the object having the object category "gas station") are displayed on the map image 301 of the navigation screen.

Figure 3D:
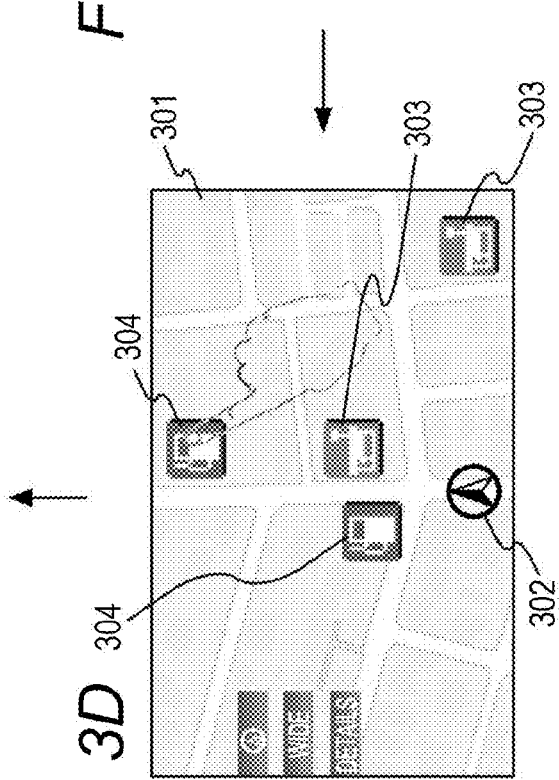

If a user touches the icon displayed on the map image 301 of the navigation screen (in FIG. 3D, gas station icon 304) as illustrated in FIG. 3D, the DISPLAY/HIDE option in the presentation control table for the object category of the object represented by the touched icon is set to "HIDE," and all icons of the object having the same object category as that of the object corresponding to the touched icon (in FIG. 3D, gas station icon 304) are not displayed on the map image 301 of the navigation screen as illustrated in FIG. 3A.

Hereinbefore, the first embodiment of the present disclosure has been described. In this manner, according to the first embodiment, through a simple manipulation just by touching a position on the map image 301 of the navigation screen corresponding to a position of an arbitrary object of the object category desired by a user to display its icon, a user is allowed to display each of the icons of the objects having this object category on the map image 301 of the navigation screen. In addition, through a simple manipulation just by touching an arbitrary object icon corresponding to the object category desired to erase out of the icons displayed on the map image 301 of the navigation screen, a user is allowed to erase each object icon of this object category from the map image 301 of the navigation screen.

A second embodiment of the present disclosure will now be described. According to the second embodiment, the controller 15 performs setting of the icon edit mode. While the icon edit mode is not set, the controller 15 performs a scroll process. In addition, the controller 15 performs a touch response presentation control process of FIG. 4 only while the icon edit mode is set.

Figure 5A:
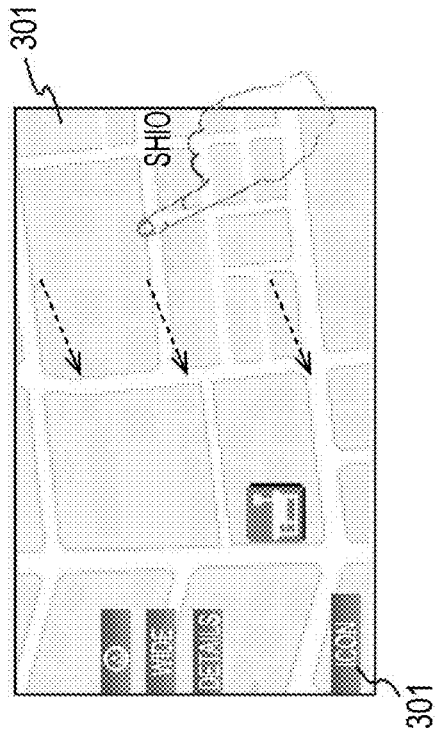
FIGS. 5A to 5D are diagrams illustrating a processing example of a touch response presentation control process according to a second embodiment of the disclosure.

FIG. 5A illustrates a navigation screen displayed according to the second embodiment. As illustrated in FIG. 5A, the navigation screen according to the second embodiment further includes an icon button 501 for receiving setting of the icon edit mode from a user in addition to the navigation screen of the first embodiment illustrated in FIGS. 3A to 3D.

Figure 5B:
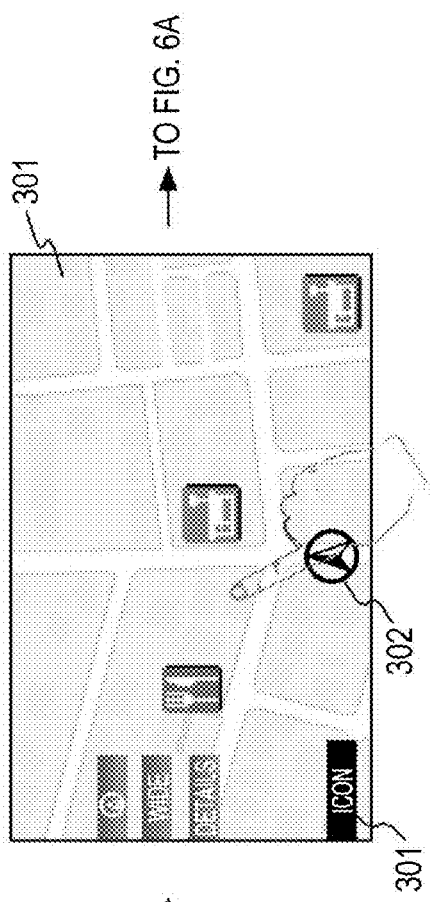

Meanwhile, if a user's touch to a position on the map image 301 of the navigation screen is detected through the touch panel 2 as illustrated in FIG. 5A when the icon edit mode is not set in this navigation screen, the controller 15 controls the navigation screen generator 16 such that the scroll process is executed to move the touch position on the map image 301 of the navigation screen toward the center of the navigation screen at a predetermined speed while continuously holding the touch as illustrated in FIG. 5B.

Figure 5C:
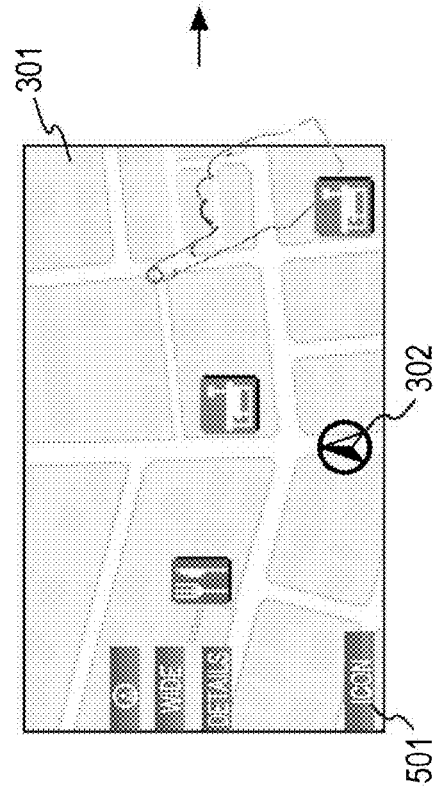

Note that the controller 15 does not execute the scroll process when the icon edit mode is set. If a user's touch to the icon button 501 on the navigation screen is detected through the touch panel 2 as illustrated in FIG. 5B, the controller 15 sets the icon edit mode as illustrated in FIG. 5C and starts the touch response presentation control process of FIG. 4. In addition, the controller 15 notifies a user of a fact that the icon edit mode is set by highlighting the icon button 501 as illustrated in FIG. 5D.

Figure 5D:
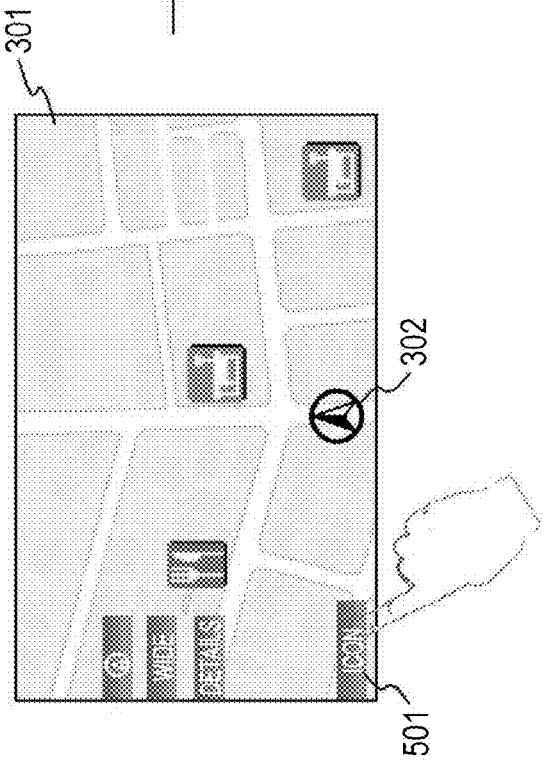

If a user touches a position of the object whose icon is not displayed on the map image 301 of the navigation screen as illustrated in FIG. 5D when the icon edit mode is set, the DISPLAY/HIDE option in the icon presentation control table is set as "DISPLAY" for the object category of the object corresponding to the touch position (in FIG. 5D, object category "gas station") through the touch response presentation control process, and icons of objects having the same object category as that of the object of the touched position (in FIG. 6A, gas station icons 304 as the object icon having the object category "gas station") are displayed on the map image 301 of the navigation screen as illustrated in FIG. 6A.

If a user touches an icon displayed on the map image 301 of the navigation screen (in FIG. 6B, convenience store icon 303) as illustrated in FIG. 6B when the icon edit mode is set, the DISPLAY/HIDE option in the icon presentation control table is set as "HIDE" for the object category of the object represented by the touched icon in the presentation control table (in FIG. 6B, object category "convenience store") as illustrated in FIG. 6C through the touch response presentation control process. In addition, as illustrated in FIG. 6C, all of the object icons having the same object category as that of the object of the touched position (in FIG. 6B, convenience store icons 303) are not displayed on the map image 301 of the navigation screen.

If a user touches the icon button 501 as illustrated in FIG. 6C when the icon edit mode is set, the controller 15 releases the icon edit mode as illustrated in FIG. 6D and terminates the touch response presentation control process. In addition, the controller 15 unhighlights the icon button 501.

Hereinbefore, the second embodiment of the present disclosure has been described.

In this manner, according to the second embodiment, a user is allowed to instruct to scroll the map image 301 through a touch manipulation on the map image 301 of the navigation screen. In addition, after the icon edit mode is set by manipulating the icon button 501, a user is allowed to instruct to display or erase each object icon of an arbitrary object category on a category-by-category basis through a simple manipulation just by touching a position on the map image 301 corresponding to the arbitrary object of the object category desired to display or touching an arbitrary object icon of the object category desired to erase.

Figure 7:
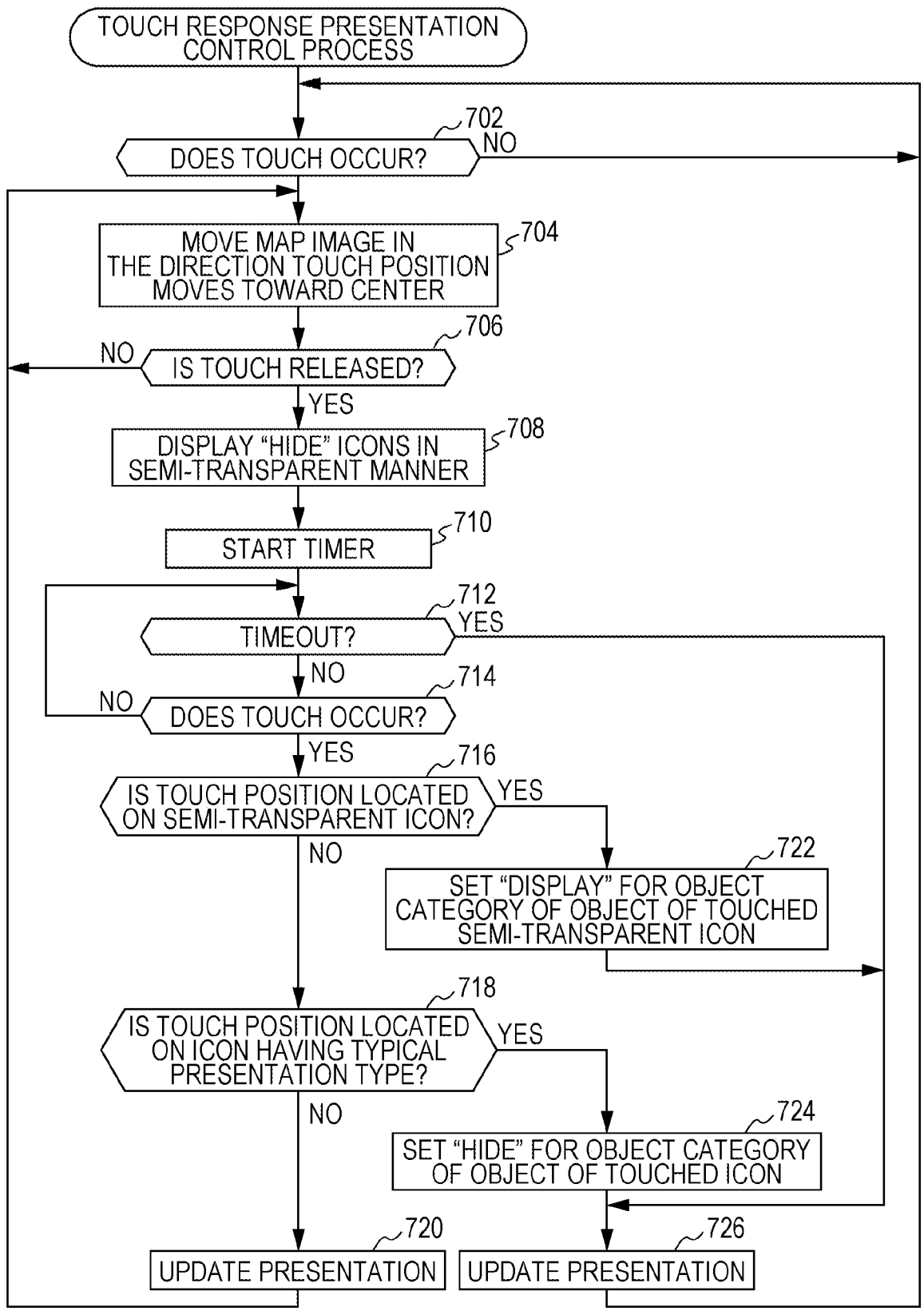
FIG. 7 is a flowchart illustrating a touch response presentation control process according to a third embodiment of the disclosure.

A third embodiment of the present disclosure will now be described. The third embodiment is different from the first embodiment in that the controller 15 performs a touch response presentation control process of FIG. 7 instead of the touch response presentation control process of FIG. 4. As illustrated in FIG. 7, in the touch response presentation control process according to the third embodiment, the controller 15 monitors occurrence of a user's touch on the touch panel 2 (step 702).

If a user's touch occurs (step 702), the controller 15 controls the navigation screen generator 16 such that the map image 301 of the navigation screen is scrolled during the continuous touch by moving the touch position on the map image 301 of the navigation screen toward the center of the navigation screen at a predetermined speed (step 704) until a release of the touch (de-touch) occurs (step 706).

If the touch is released, the navigation screen generator 16 displays the object icon of the object category set as "HIDE" in the DISPLAY/HIDE option of the icon presentation control table, that is, the object icon that is not currently displayed, on the map image 301 in a semitransparent manner (step 708).

A timer in which a predetermined timeout period (for example, four seconds) is set starts (step 710) to monitor occurrence of a timeout of the timer (step 712) and occurrence of a user's touch on the touch panel 2 (step 714).

If the timeout occurs, the navigation screen generator 16 updates presentation of the navigation screen such that only object icons of the object category set as "DISPLAY" in the DISPLAY/HIDE option of the icon presentation control table out of the object icons are displayed (the semitransparent icons are erased) (step 726). Then, the process returns to step 702.

If a touch occurs (step 714), it is determined whether or not the touch position is a position where the semitransparent icon is displayed (step 716). If the touch position is a position where the semitransparent icon is displayed, the object category recorded in the object record of the object represented by the semitransparent icon of the touched position is obtained, and the obtained object category is set as "DISPLAY" in the DISPLAY/HIDE option of the icon presentation control table (step 722).

The navigation screen generator 16 updates presentation on the navigation screen such that only object icons of the object category set as "DISPLAY" in the DISPLAY/HIDE option of the icon presentation control table out of the object icons are displayed (step 726), and the process returns to step 702.

Meanwhile, it is determined whether or not the touch position is a position where an opaque icon, which is a typical type, is displayed, that is, a position where an object icon of the object category set as "DISPLAY" in the DISPLAY/HIDE option of the icon presentation control table is displayed (step 718). If the touch position is a position where an icon of a typical type is displayed, the object category recorded in the object record of the object represented by the icon of the touch position is obtained, and the obtained object category is set as "HIDE" in the DISPLAY/HIDE option of the icon presentation control table (step 724).

The navigation screen generator 16 updates presentation of the navigation screen such that only object icons of the object category set as "DISPLAY" in the DISPLAY/HIDE option of the icon presentation control table are displayed (step 726), and the process returns to step 702.

Meanwhile, if the touch position is neither a position where a semitransparent icon is displayed (step 716) nor a position where a typical opaque icon is displayed (step 718), the navigation screen generator 16 updates presentation of the navigation screen such that only object icons of the object category set as "DISPLAY" in the DISPLAY/HIDE option of the icon presentation control table out of the object icons are displayed (step 720), and the process returns to step 704.

Figure 8A:
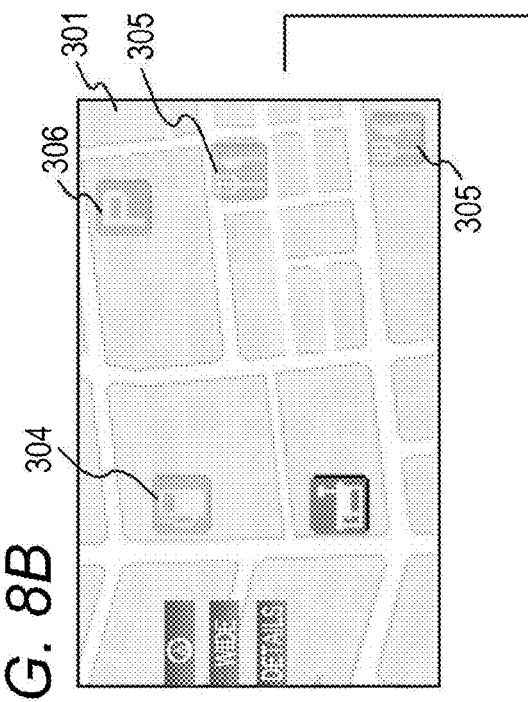
FIGS. 8A to 8D are diagrams illustrating a processing example of the touch response presentation control process according to the third embodiment of the disclosure.

Hereinbefore, the touch response presentation control process performed by the controller 15 according to the third embodiment has been described. In this touch response presentation control process according to the third embodiment, for example, if a user's touch to a position on the map image 301 of the navigation screen is detected through the touch panel 2 when only the convenience store icons 303 are displayed on the map image 301 of the navigation screen as illustrated in FIG. 8A, the controller 15 controls the navigation screen generator 16 such that the touch position on the map image 301 of the navigation screen is scrolled toward the center of the navigation screen.

Figure 8B:
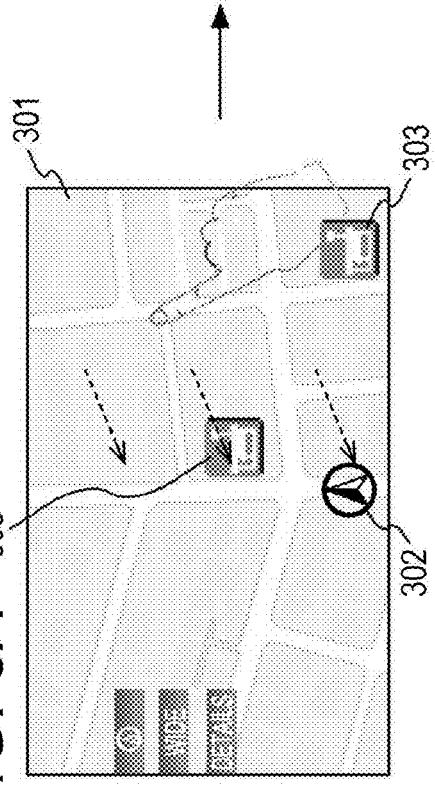

If the scrolling is released, object icons of the object category set as "HIDE" in the DISPLAY/HIDE option of the icon presentation control table, that is, the icons 304 to 306 that are not displayed before scrolling, are displayed on the map image 301 of the navigation screen of FIG. 8B after a scrolling in a semitransparent manner.

Figure 8C:
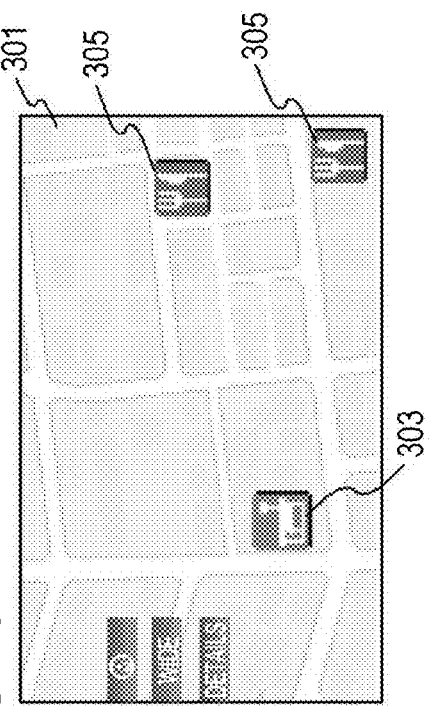
Figure 8D:
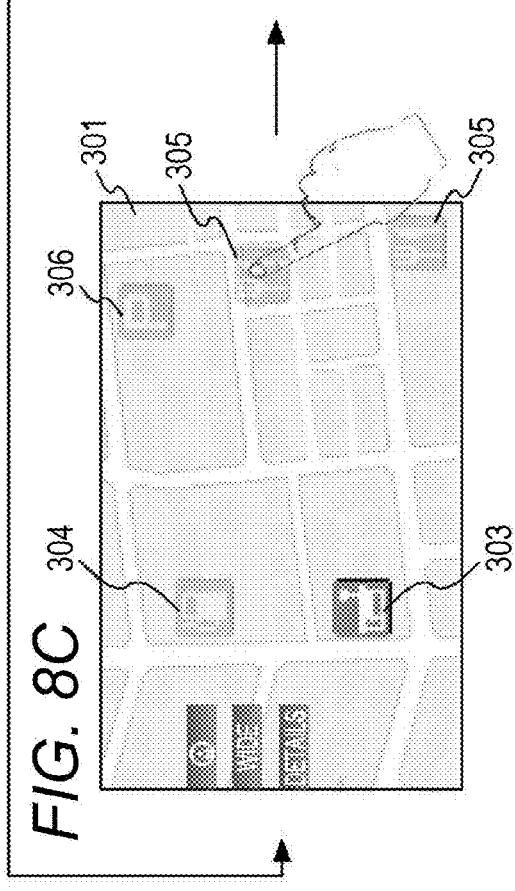

In this state, if a user touches a restaurant icon 305 which is an icon of an object category "restaurant" out of icons displayed in a semitransparent manner as illustrated in FIG. 8C, the icons 304 and 306 other than the touched restaurant icon 305 displayed in a semitransparent manner disappear as illustrated in FIG. 8D. In addition, only the convenience store icon 303 that has been continuously displayed in advance of the start of the scrolling and the touched restaurant icon 305 are displayed on the map image 301 of the navigation screen in a typical opaque manner subsequently.

Figure 9A:
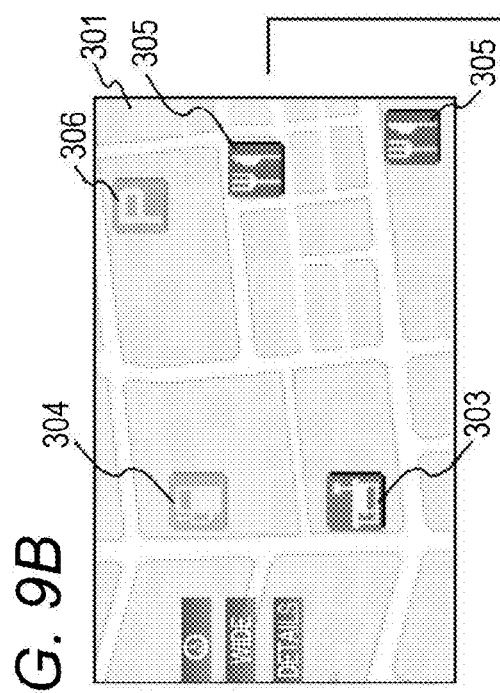
FIGS. 9A to 9D are diagrams illustrating a processing example of the touch response presentation control process according to the third embodiment of the disclosure.

In the touch response presentation control process according the third embodiment, if a user's touch to a position on the map image 301 of the navigation screen is detected through the touch panel 2 when only the convenience store icon 303 and the restaurant icon 305 are displayed on the map image 301 of the navigation screen as illustrated in FIG. 9A, the controller 15 controls the navigation screen generator 16 such that the touch position on the map image 301 of the navigation screen is scrolled toward the center of the navigation screen.

Figure 9B:
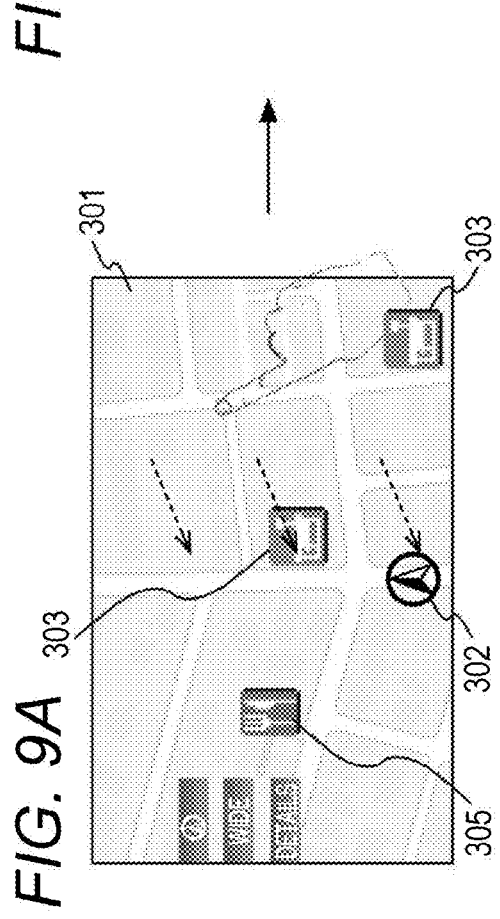

If the scrolling is released, the object icons of the object category set as "HIDE" in the DISPLAY/HIDE option of the icon presentation control table, that is, the icons 304 and 306 that are not displayed before the scrolling, are displayed on the map image 301 of the navigation screen of FIG. 9B after a scrolling in a semitransparent manner.

Figure 9C:
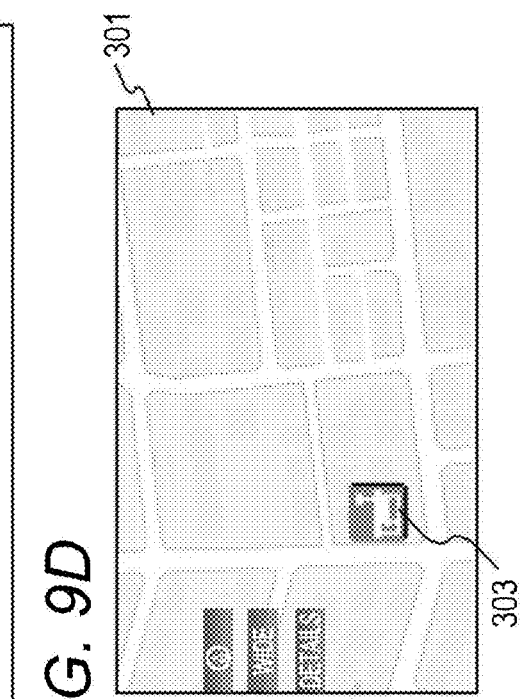
Figure 9D:
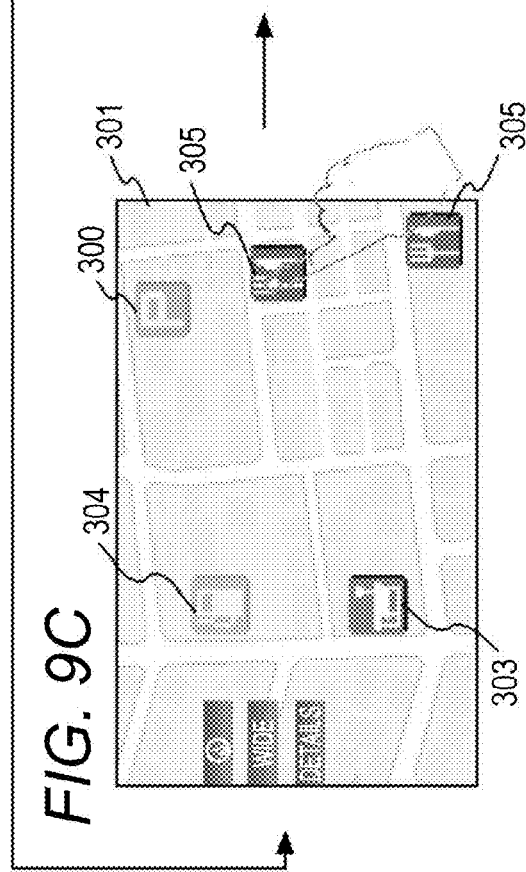

In this state, if a user touches the restaurant icon 305 out of the icons 303 and 305 displayed in a typical opaque manner in advance of the start of the scrolling as illustrated in FIG. 9C, the semitransparent icons are hidden. In addition, the touched restaurant icon 305 out of the icons 303 and 305 displayed in advance of the start of the scrolling is not displayed in the map image 301 of the navigation screen subsequently, and only the convenience store icon 303 is displayed as illustrated in FIG. 9D.

Hereinbefore, the third embodiment of the present disclosure has been described. In this manner, according to the third embodiment, a user is allowed to instruct to scroll the map image 301 through a touch manipulation on the map image 301 of the navigation screen. In addition, a user is allowed to instruct to display or erase each object icon of an arbitrary object category on a category-by-category basis through a simple manipulation just by touching an arbitrary object icon of the object category displayed in a semitransparent manner after scrolling and desired to display or touching an arbitrary object icon of the object category displayed in a typical display manner and desired to erase.

Hereinafter, a fourth embodiment of the present disclosure will now be described. In the fourth embodiment, the present disclosure is applied to a portable navigation device 1 such as a smart phone having a navigation functionality.

A configuration and operation of the mobile device according to the fourth embodiment are similar to those of the vehicle built-in system (FIGS. 1 and 2) according to the first embodiment. However, the fourth embodiment is different from the first embodiment in that the condition check sensor 4 detects a travel direction or a speed of the mobile device instead of the travel direction or the speed of the vehicle, and a touch response presentation control process of FIG. 10 is performed instead of the touch response presentation control process of FIG. 4.

Figure 10:
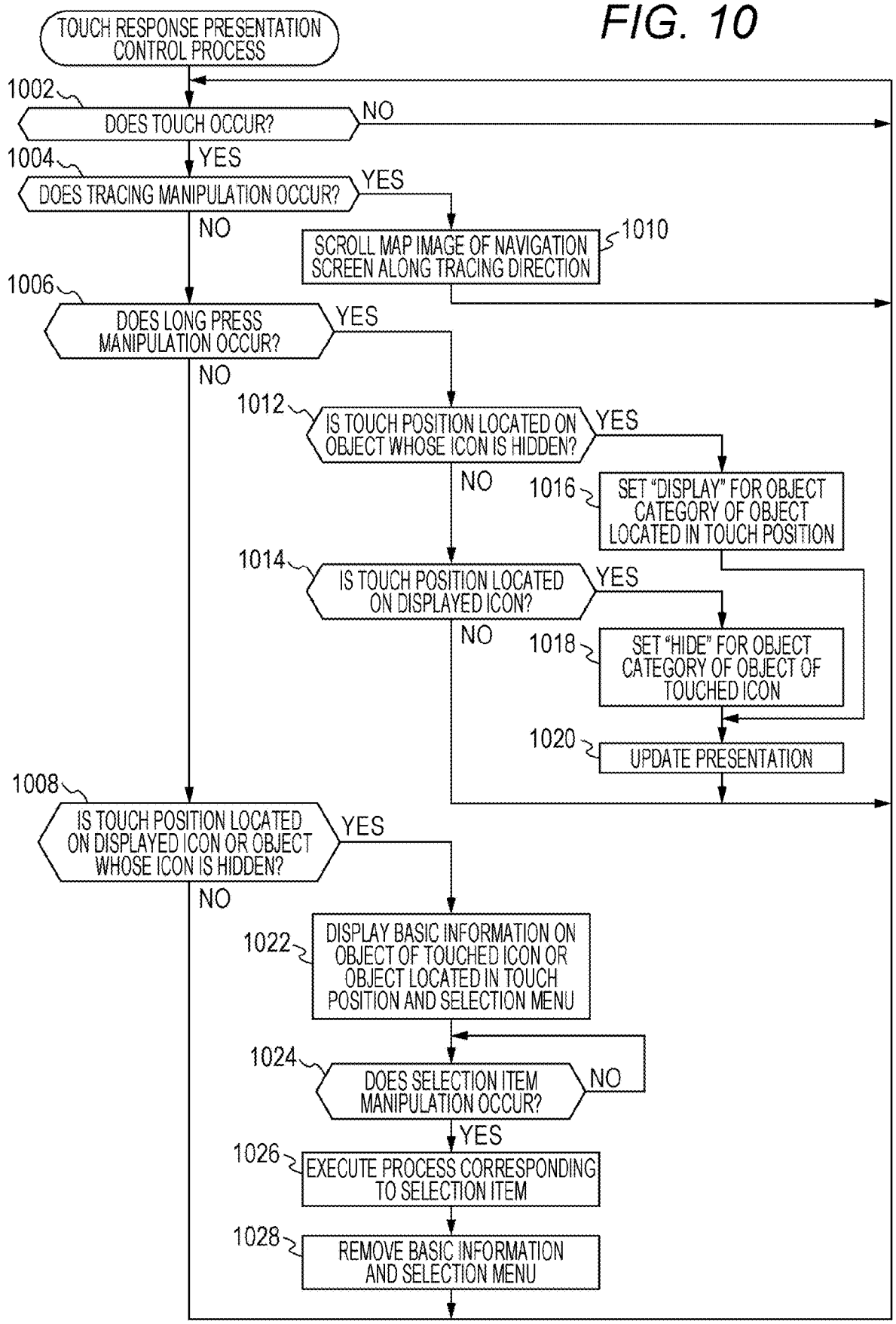
FIG. 10 is a flowchart illustrating a touch response presentation control process according to a fourth embodiment of the disclosure.

In the touch response presentation control process according to the fourth embodiment, the controller 15 monitors occurrence of a user's touch to the touch panel 2 as illustrated in FIG. 10 (step 1002).

If a touch occurs (step 1002), it is determined whether a tracing manipulation (step 1004) or a long press manipulation (step 1006) occurs.

Here, the tracing manipulation refers to a manipulation of moving the touch position while holding the touch on the touch panel 2. The long press manipulation refers to a manipulation of holding the touch for a predetermined time or long without moving the touch position.

If the tracing manipulation is detected (step 1004), the navigation screen generator 16 is controlled such that the map image 301 is scrolled by moving the map image 301 of the navigation screen in a tracing direction (movement direction of the touch position) until the tracing manipulation is not detected (step 1010). Then, the process returns to step 1002.

Meanwhile, if a long press manipulation occurs (step 1006), it is determined whether or not the touch position is a position on the map image 301 corresponding to the object position where no icon is displayed (step 1012) and whether or not the touch position is a position where an icon is displayed (step 1014).

If the touch position is a position on the map image 301 corresponding to the object position where no icon is displayed (step 1012), an object category recorded in the object record of the object corresponding to the touch position is obtained, and the obtained object category is set as "DISPLAY" in the DISPLAY/HIDE option of the icon presentation control table (step 1016). Then, the navigation screen generator 16 updates presentation of the navigation screen (step 1020), and the process returns to step 1002 for monitoring.

If the touch position is a position where an icon is displayed (step 1014), an object category recorded in the object record of the object represented by the icon of the touch position is obtained, and the obtained object category is set as "HIDE" in the DISPLAY/HIDE option of the icon presentation control table (step 1018). Then, the navigation screen generator 16 updates presentation of the navigation screen (step 1020), and the process returns to step 1002 for monitoring.

Meanwhile, if the touch position is neither a position located on the map image 301 corresponding to the object position where no icon is displayed (step 1012) nor a position where an icon is displayed (step 1014), the process directly returns to step 1002 for monitoring.

Meanwhile, if neither occurrence of the tracing manipulation (step 1004) nor occurrence of the long press manipulation (step 1006) is detected, it is determined that a typical touch manipulation occurs for a short time on the touch panel. In addition, it is determined whether the touch position is a position where an icon is displayed or a position on the map image 301 corresponding to the object position where no icon is displayed (step 1008).

Assuming that the touch position is a position where an icon is displayed or a position on the map image 301 corresponding to the object position where no icon is displayed, if the touch position is a position where an icon is displayed, the touched icon is set as a selected object. If the touch position is a position on the map image 301 corresponding to the object position where no icon is displayed, an object positioned in this touch position is set as a "selected object." In addition, basic information on the "selected object" such as a name of the object and a selection menu containing a selection item list obtained by defining predetermined manipulations allowable for the object in advance are displayed overlappingly on the navigation screen (step 1022).

If a user's manipulation for the selection item occurs (step 1024), a manipulation defined for the selection item manipulated by a user is performed for the selected object (step 1026), and the basic information and the selection menu are erased from presentation (step 1028). Then, the process returns to step 1002.

Meanwhile, if the touch position where a typical touch manipulation is performed is neither a position where an icon is displayed nor a position located on the map image 301 corresponding to the object position where no icon is displayed (step 1008), the process directly returns to step 1002.

Figure 11A:
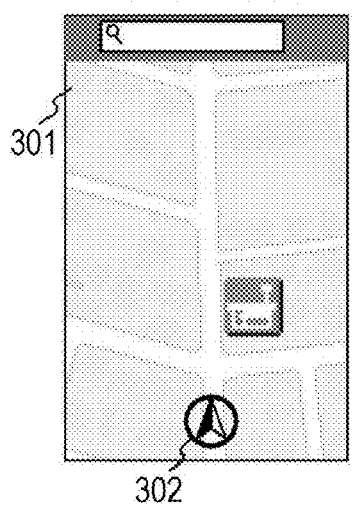
FIGS. 11A to 11G are diagrams illustrating a processing example of the touch response presentation control process according to the fourth embodiment of the disclosure.
Figure 11B:
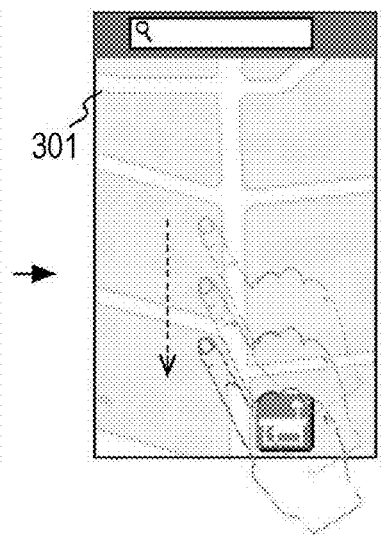

Hereinbefore, the touch response presentation control process according to the fourth embodiment has been described. In the touch response presentation control process according to the fourth embodiment, if a user performs a tracing manipulation by moving the touch position while holding the touch as illustrated in FIG. 11B on the navigation screen displayed as illustrated in FIG. 11A, the map image 301 of the navigation screen is scrolled along a movement direction of the touch position generated by the tracing manipulation.

Figure 11C:
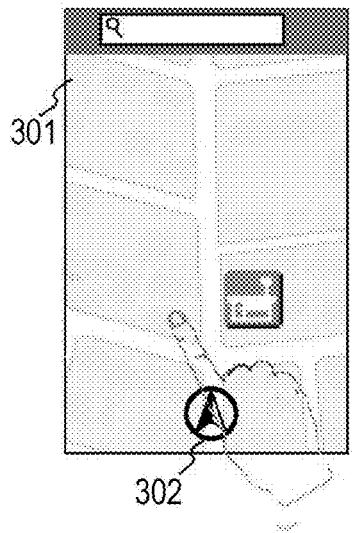
Figure 11D:
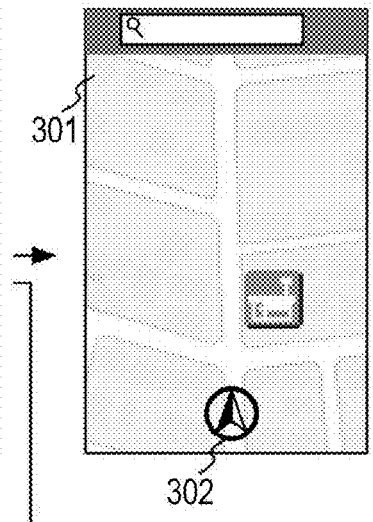
Figure 11E:
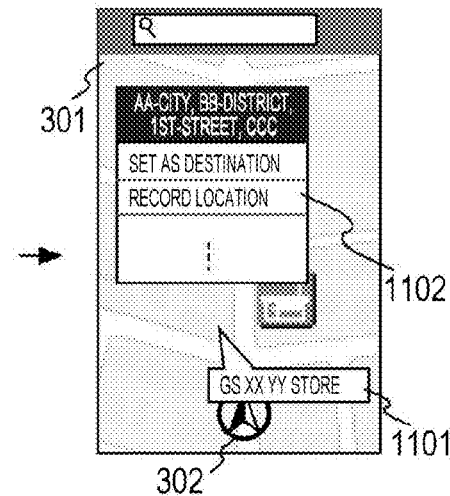

If a user performs a touch manipulation by touching a position corresponding to the object position where no icon is displayed for a short time as illustrated in FIGS. 11C and 11D on the navigation screen displayed as illustrated in FIG. 11C, basic information 1101 such as a name of the object corresponding to the touch position and a selection menu 1102 are displayed overlappingly on the navigation screen as illustrated in FIG. 11E. In addition, if a user manipulates a selection item of the selection menu 1102, a process corresponding to the manipulated selection item is executed for the object corresponding to the touch position. That is, for example, if a user manipulates a selection item "SET AS DESTINATION," a process of setting the object corresponding to the touch position as a destination is performed.

Figure 11F:
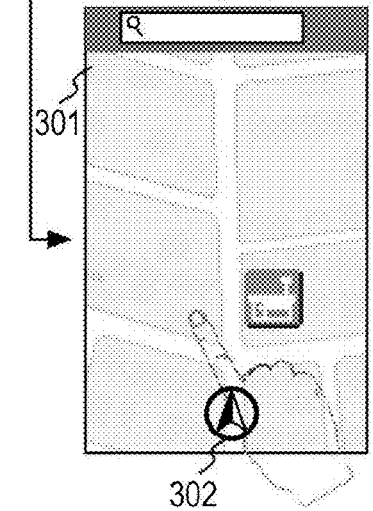
Figure 11G:
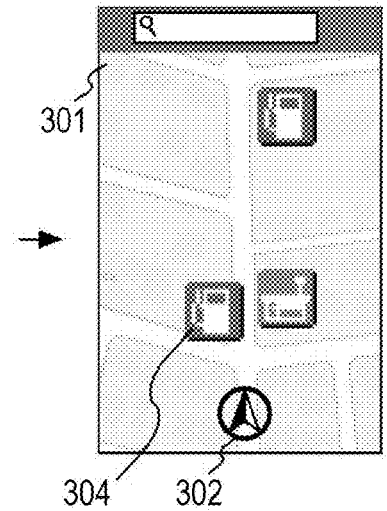

If a user makes a long press manipulation by touching a position corresponding to an object position where no icon is displayed for a long time as illustrated in FIGS. 11C and 11F on the navigation screen displayed as illustrated in FIG. 11C, the DISPLAY/HIDE option of the icon presentation control table for the object category of the object corresponding to the touch position (in FIG. 11C, object category "gas station") is set as "DISPLAY". Then, object icons having the same object category as that of this object (gas station icons 304) are displayed on the map image 301 of the navigation screen as illustrated in FIG. 11G.

If a user makes a touch manipulation by touching an icon for a short time as illustrated in FIGS. 12A and 12B on the navigation screen displayed as illustrated in FIG. 12A, basic information 1101 such as a name of the object of the touched icon and a selection menu 1102 are displayed overlappingly on the navigation screen as illustrated in FIG. 12C. In addition, if a user manipulates a selection item of the selection menu 1102, a process corresponding to the manipulated selection item is executed for the object of the touched icon. That is, for example, if a user manipulates a selection item "SET AS DESTINATION," a process of setting the object of the touched icon as a destination is performed.

If a user makes a long press manipulation by touching an icon for a long time as illustrated in FIGS. 12A and 12D on the navigation screen displayed as illustrated in FIG. 12A, the object category of the object of the touched icon (in FIG. 12A, object category "gas station") is set as "HIDE" in the DISPLAY/HIDE option of the icon presentation control table. Then, as illustrated in FIG. 12E, icons of the objects having the same object category as that of this object (gas station icons 304) are not displayed on the map image 301 of the navigation screen.

Hereinbefore, the fourth embodiment of the present disclosure has been described. In this manner, according to the fourth embodiment, a user is allowed to instruct to scroll the map image 301 through a tracing manipulation on the map image 301 of the navigation screen. In addition, a user is allowed to instruct to display or erase icons of each object of an arbitrary object category on a category-by-category basis through a simple and easy manipulation just by performing a long press manipulation for a position on the map image 301 of the navigation screen corresponding to a position of an arbitrary object of an object category desired by a user to display its icon or performing a long press manipulation for an icon of an arbitrary object of an object category desired to erase.

A fifth embodiment of the present disclosure will now be described. The fifth embodiment is similar to the fourth embodiment except for a fact that a touch response presentation control process of FIG. 13 is executed instead of the touch response presentation control process of FIG. 10.

Figure 13:
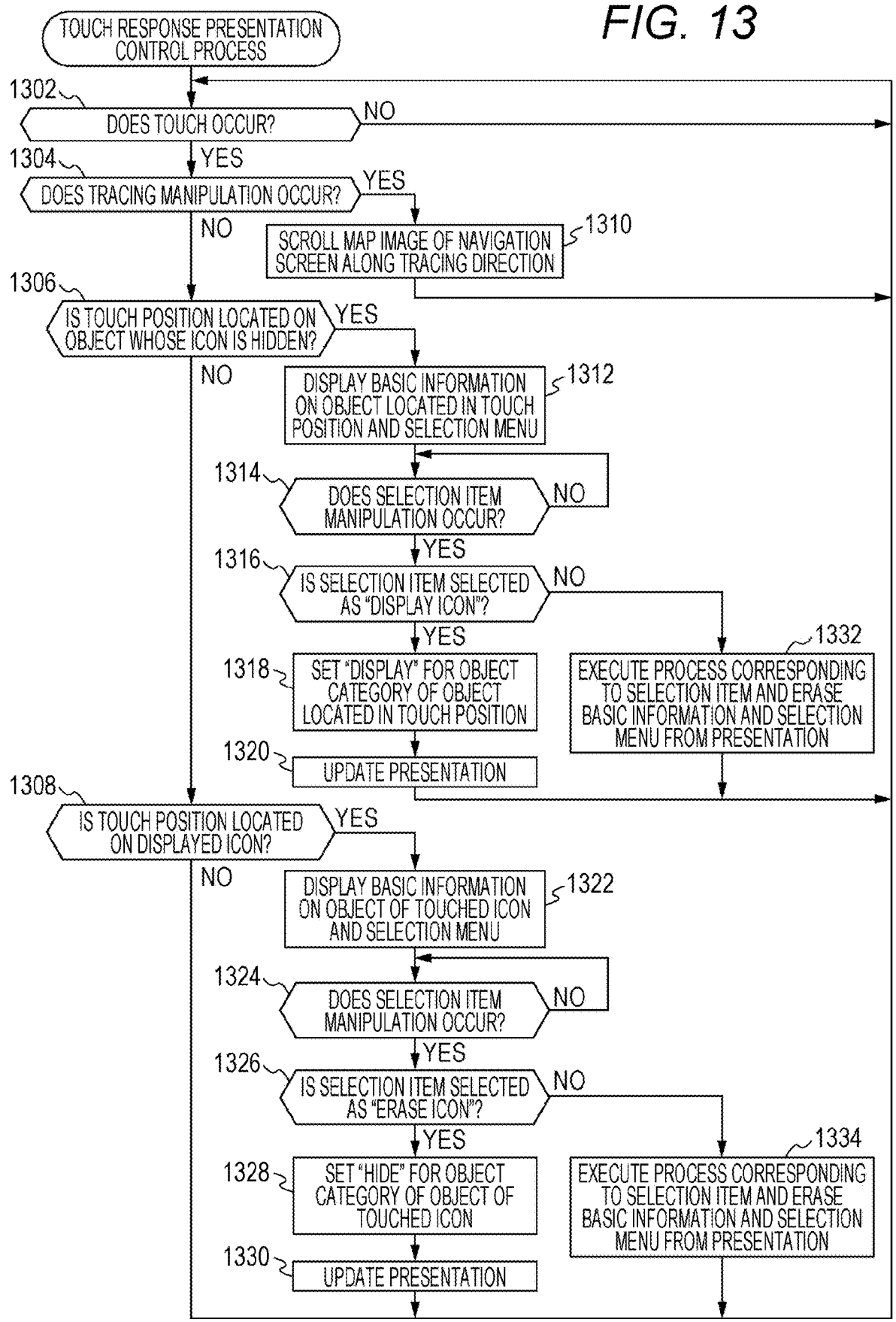
FIG. 13 is a flowchart illustrating a touch response presentation control process according to a fifth embodiment of the disclosure.

In the touch response presentation control process according to the fifth embodiment, the controller 15 monitors occurrence of a user's touch to the touch panel 2 as illustrated in FIG. 13 (step 1302). If a touch occurs (step 1302), the controller 15 determines whether or not a tracing manipulation occurs and is detected (step 1304). If a tracing manipulation is detected (step 1304), the navigation screen generator 16 is controlled such that the map image 301 is scrolled by moving the map image 301 of the navigation screen along a tracking direction (movement direction of the touch position) until the tracing manipulation is released (step 1310). Then, the process returns to step 1302.

Otherwise, if a tracing manipulation is not detected, it is determined that a typical touch manipulation occurs. In addition, it is determined whether or not the touch position is a position on the map image 301 corresponding to an object position where no icon is displayed (step 1306) and whether or not the touch position is a position where an icon is displayed (step 1308).

If the touch position is a position on the map image 301 corresponding to an object position where no icon is displayed (step 1306), basic information 1101 such as a name of the object corresponding to the touch position and a selection menu 1102 representing a list of selection items obtained by defining predetermined manipulations allowable for the object in advance are displayed overlappingly on the navigation screen (Step 1312). Here, the selection menu 1102 displayed in step 1312 contains a selection item "DISPLAY ICON."

If a user's manipulation to the selection item occurs (step 1314), it is determined whether or not the selection item manipulated by a user is a selection item "DISPLAY ICON" (step 1316). If the selection item manipulated by a user is not a selection item "DISPLAY ICON," a manipulation defined for the selection item manipulated by a user is performed for the object of the touched icon, and the basic information 1101 and the selection menu 1102 are erased from presentation (step 1332). Then, the process returns to step 1002.

Otherwise, if the selection item manipulated by a user is a selection item "DISPLAY ICON" (step 1316), an object category recorded in the object record of the object corresponding to the touch position is obtained, and the obtained object category is set as "DISPLAY" (step 1318) in the DISPLAY/HIDE option of the icon presentation control table. Then, the basic information 1101 and the selection menu 1102 are erased from presentation, and the navigation screen generator 16 updates presentation on the navigation screen (step 1320). Then, the process returns to step 1302 for monitoring.

Meanwhile, if the touch position is a position where an icon is displayed (step 1308), basic information 1101 such as a name of the object of the touched icon and a selection menu 1102 representing a list of the selection items obtained by defining predetermined manipulations allowable for the object in advance are displayed overlappingly on the navigation screen (Step 1322). Here, the selection menu 1102 displayed in step 1322 contains a selection item "ERASE ICON."

If a user's manipulation for the selection item occurs (step 1324), it is determined whether or not the selection item manipulated by a user is a selection item "ERASE ICON" (step 1326). If the selection item manipulated by a user is not the selection item "ERASE ICON," a manipulation defined for the selection item manipulated by the user is performed for the object of the touched icon to erase the basic information 1101 and the selection menu 1102 from presentation (step 1334). Then, the process returns to step 1002.

Otherwise, if the selection item manipulated by the user is the selection item "ERASE ICON," an object category recorded in the object record of the object of the touched icon is obtained, and the obtained object category is set as "HIDE" in the DISPLAY/HIDE option of the icon presentation control table (step 1328). Then, the basic information 1101 and the selection menu 1102 are erased from presentation, and the navigation screen generator 16 updates presentation of the navigation screen (step 1330). Then, the process returns to step 1302 for monitoring.

Meanwhile, if the touch position is neither a position located on the map image 301 corresponding to the object position where no icon is displayed (step 1306) nor a position where an icon is displayed (step 1308), the process directly returns to step 1302 for monitoring.

Figure 14A:
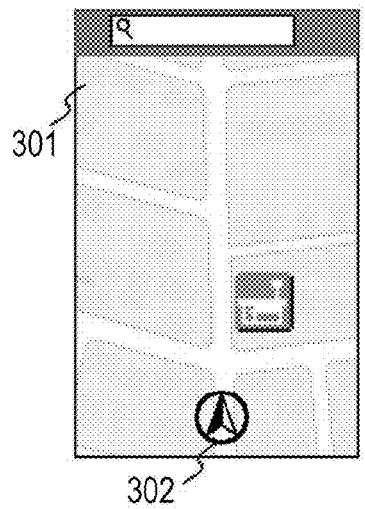
FIGS. 14A to 14H are diagrams illustrating a processing example of the touch response presentation control process according to the fifth embodiment of the disclosure.
Figure 14B:
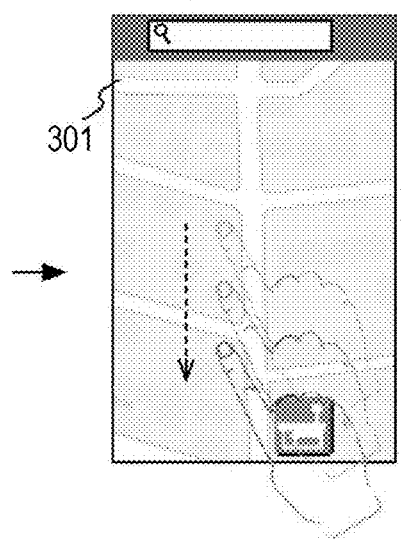

Hereinbefore, the touch response presentation control process according to the fifth embodiment has been described. In the touch response presentation control process according to the fifth embodiment, if a user performs a tracing manipulation by moving the touch position while holding the touch as illustrated in FIG. 14B on the navigation screen displayed as illustrated in FIG. 14A, the map image 301 of the navigation screen is scrolled along a movement direction of the touch position generated by the tracing manipulation.

Figure 14C:
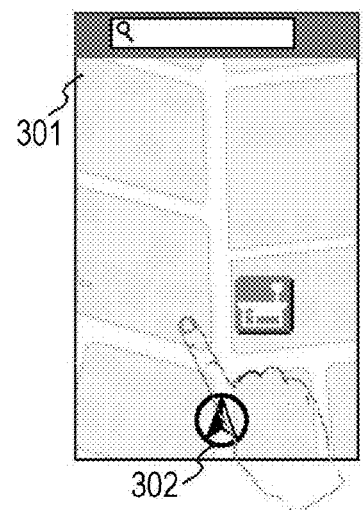
Figure 14D:
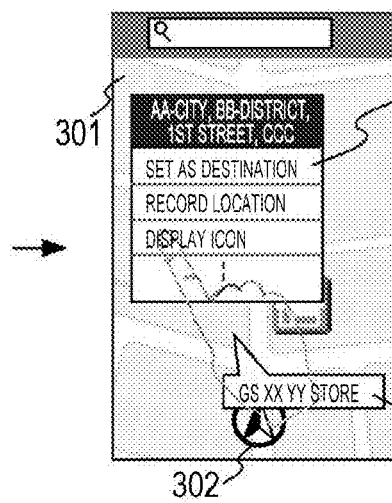

If a user performs a touch manipulation by touching a position corresponding to the object position where no icon is displayed on the navigation screen displayed as illustrated in FIG. 14C, basic information 1101 such as a name of the object corresponding to the touch position and a selection menu 1102 are displayed overlappingly on the navigation screen as illustrated in FIG. 14D. In addition, if a user manipulates a selection item of the selection menu 1102, a process corresponding to the manipulated selection item is executed for the object corresponding to the touch position.

Figure 14E:
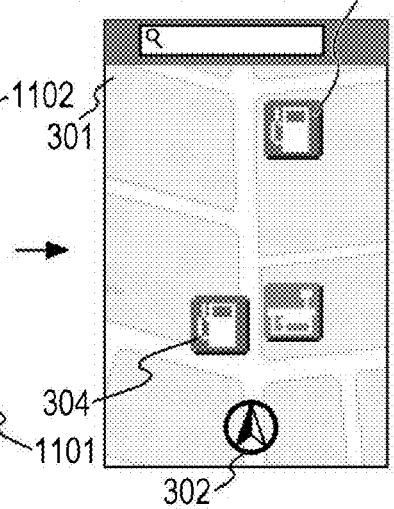

If the selection item manipulated in this case is a selection item "DISPLAY ICON" as illustrated in FIG. 14D, the object category of the object corresponding to the touch position (in FIG. 14D, object category "gas station") is set as "DISPLAY" in the DISPLAY/HIDE option of the icon presentation control table. Then, object icons having the same object category as that of this object (gas station icons 304) are displayed on the map image 301 of the navigation screen as illustrated in FIG. 14E.

Figure 14F:
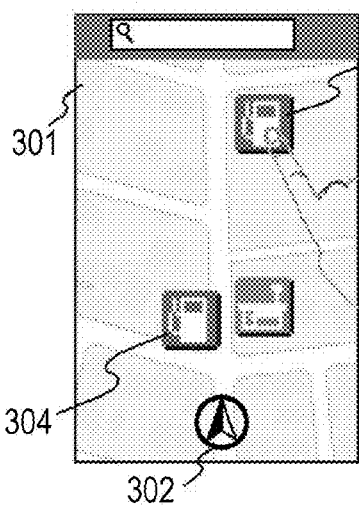
Figure 14G:
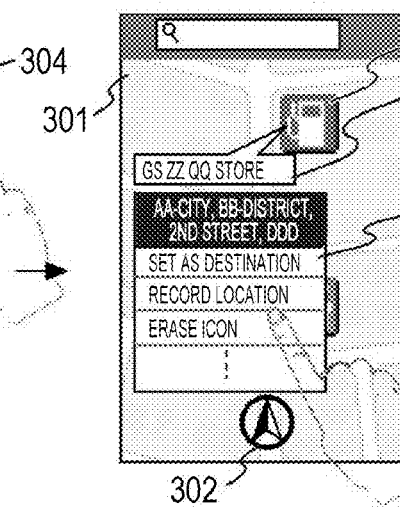

If a user makes a touch manipulation by touching an icon on the navigation screen displayed as illustrated in FIG. 14F, the basic information 1101 such as a name of the object of the touched icon and the selection menu 1102 are displayed overlappingly on the navigation screen as illustrated in FIG. 14G. In addition, if a user manipulates a selection item of the selection menu 1102, a process corresponding to the manipulated selection item is executed for the object of the touched icon.

Figure 14H:
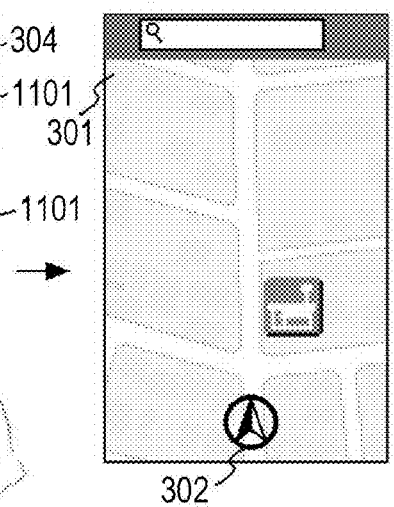

If the selection item manipulated in this case is a selection item "ERASE ICON" as illustrated in FIG. 14G, the object category of the object of the touched icon (in FIG. 14G, object category "gas station") is set as "HIDE" in the DISPLAY/HIDE option of the icon presentation control table. Then, as illustrated in FIG. 14H, icons of the objects having the same object category as that of this object (gas station icons 304) are not displayed on the map image 301 of the navigation screen.

Hereinbefore, the fifth embodiment according to the present disclosure has been described. In this manner, according to the fifth embodiment, a user is allowed to instruct to scroll the map image 301 through a tracing manipulation on the map image 301 of the navigation screen. In addition, a user is allowed to instruct to display or erase icons of each object of an arbitrary object category on a category-by-category basis through a simple and easy manipulation just by selecting a selection item "DISPLAY ICON" of the selection menu 1102 displayed by touching a position on the map image 301 of the navigation screen corresponding to an arbitrary object position of the object category of the icon desired to display or selecting a selection item "ERASE ICON" of the selection menu 1102 displayed by touching an arbitrary object icon of the object category desired to erase.

Hereinbefore, the embodiments of the present disclosure have been described.

Although the touch panel 2 is employed to input a position from a user in the embodiments described above, any pointing device such as a mouse or a track pad may also be employed to input a position from a user.

Although general object classifications such as a gas station or a restaurant are employed as the object category in the embodiments described above, the object category may be subdivided for each brand of the object such as a franchise brand, or a broader category of the object classified by its use, such as mills or shopping, may also be employed as the object category.

The technology of controlling DISPLAY or HIDE states of the object icons described in the aforementioned embodiments may be similarly applied to any map presentation system that selectively displays icons representing objects on a map.

The invention claimed is:

1. A map presentation system configured to display a map, comprising:
 a processor configured to execute a plurality of units, the plurality of units comprising:
 an icon DISPLAY/HIDE setting unit configured to set a DISPLAY/HIDE option of an icon representing an object of an object category for each of the object categories representing a category of the object;
 a presentation image display unit configured to display a presentation image on the map, the presentation image comprising icons displayed at a geographic location of each object on the map, in which icons representing an object of an object category set as "HIDE" are not arranged on the map, and icons representing an object of an object category set as "DISPLAY" are arranged on the map; and
a position input receiver unit configured to receive a position input at a point on the presentation image,
wherein, if the position of the input received by the position input receiver unit is a geographic location on the map overlapping with an individual object position of an object category set as "HIDE," the icon DISPLAY/HIDE setting unit recognizes the object category of the object corresponding to the input position on the map and sets "DISPLAY" for the recognized object category, such that the presentation image display unit displays all icons on the map that correspond to the recognized object category.

2. The map presentation system according to claim 1, wherein, if a position of the input received by the position input receiver unit is overlapping with a geographic location where an individual icon is displayed, the icon DISPLAY/HIDE setting unit recognizes an object category of the object represented by the icon located at the input position and sets "HIDE" for the recognized object category.

3. The map presentation system according to claim 1, further comprising:
a mode setting unit configured to set an icon presentation edit mode in response to a user's manipulation; and
a scroll control unit,
wherein the position input receiver unit receives an input at the position only while the icon presentation edit mode is set, and
the scroll control unit receives an input at a position on the presentation image and causes the presentation image display unit to perform scrolling of a map of the presentation image depending on the input position while the icon presentation edit mode is not set.

4. The map presentation system according to claim 1, further comprising:
a touch panel; and
a scroll control unit,
wherein the position input receiver unit receives an input at a position on the presentation image corresponding to a touch position when a position is continuously touched for a predetermined time or longer without moving the touch position on the touch panel, and
the scroll control unit causes the presentation image display unit to perform scrolling of the map of the presentation image when the touch position is moved by holding the touch on the touch panel.

5. A map presentation system configured to display a map, comprising:
a processor configured to execute a plurality of units, the plurality of units comprising:
an icon DISPLAY/HIDE setting unit configured to set a DISPLAY/HIDE option of an icon representing an object of an object category for each of the object categories representing a category of the object;
a presentation image display unit configured to display a presentation image on the map, the presentation image comprising icons displayed at a geographic location of each object on the map, in which icons representing an object of an object category set as "HIDE" are not arranged on the map, and icons representing an object having an object category set as "DISPLAY" are arranged on the map; and
a position input receiver unit configured to receive an input at a point on the presentation image,
wherein, if the input position received by the position input receiver unit is overlapping with a geographic location where an individual icon is displayed, the icon DISPLAY/HIDE setting unit recognizes an object category of the object represented by the icon located at the input position and sets "HIDE" for the recognized object category, such that the presentation image display unit does not display any icons on the map that correspond to the recognized object category.

6. The map presentation system according to claim 5, further comprising:
a mode setting unit configured to set an icon presentation edit mode in response to a user's manipulation; and
a scroll control unit,
wherein the position input receiver unit receives an input at fthe position only while the icon presentation edit mode is set, and
the scroll control unit receives an input at a position on the presentation image and causes the presentation image display unit to perform scrolling of a map of the presentation image depending on the input position while the icon presentation edit mode is not set.

7. The map presentation system according to claim 5, further comprising:
a touch panel; and
a scroll control unit,
wherein the position input receiver unit receives an input at a position on the presentation image corresponding to a touch position when a position is continuously touched for a predetermined time or longer without moving the touch position on the touch panel, and
the scroll control unit causes the presentation image display unit to perform scrolling of the map of the presentation image when the touch position is moved by holding the touch on the touch panel.

8. A map presentation system configured to display a map, comprising:
a processor configured to execute a plurality of units, the plurality of units comprising:
an icon DISPLAY/HIDE setting unit configured to set a DISPLAY/HIDE option of an icon representing an object of an object category for each of the object categories representing a category of the object;
a presentation image display unit configured to display a presentation image on the map, the presentation image comprising icons displayed at a geographic location of each object on the map, in which icons representing an object of an object category set as "HIDE" are not arranged on the map, and icons representing an object having an object category set as "DISPLAY" are arranged on the map; and
a position input receiver unit configured to receive an input at a point on the presentation image,
wherein, if the input position received by the position input receiver unit is overlapping with a geographic location on the map corresponding to an individual object position of an object category set as "HIDE," the icon DISPLAY/HIDE setting unit displays a menu containing menu items for receiving an instruction to change a presentation setting of an object icon corresponding to the geographic location on the map and sets "DISPLAY" for the object category of the object corresponding to the geographic location on the map when an instruction to change the presentation setting of the icon is received on the displayed menu, such that the presentation image display unit displays all icons on the map that correspond to the object category of the object corresponding to the geographic location.

9. The map presentation system according to claim 8, wherein, if the input position received by the position input receiver unit is a geographic location where an icon is displayed, the icon DISPLAY/HIDE setting unit displays a menu containing menu items for receiving an instruction to change a presentation setting of the icon located at the input position and sets "HIDE" for the object category of the object represented by the icon located at the input position when the instruction to change the presentation setting of the icon is received on the displayed menu.

10. A navigation system comprising:
   the map presentation system according to claim 9; and
   a current position computation unit configured to compute a current position,
   wherein the presentation image display unit displays an image as the presentation image on the map, the image including a mark representing the current position computed by the current position computation unit and icons representing the objects having the object category set as "DISPLAY" on the map.

\* \* \* \* \*

UNITED STATES PATENT AND TRADEMARK OFFICE
CERTIFICATE OF CORRECTION

PATENT NO. : 10,754,501 B2  
APPLICATION NO. : 15/468754  
DATED : August 25, 2020  
INVENTOR(S) : Rie Chiba Page 1 of 1

It is certified that error appears in the above-identified patent and that said Letters Patent is hereby corrected as shown below:

In the Claims

Column 18, Claim 6, Line 14, delete "fthe" and replace with --the--

Signed and Sealed this  
Twenty-ninth Day of September, 2020

Andrei Iancu  
*Director of the United States Patent and Trademark Office*